(12) United States Patent
Min et al.

(10) Patent No.: US 8,830,851 B2
(45) Date of Patent: Sep. 9, 2014

(54) APPARATUS AND METHOD FOR SUPPORTING COVERAGE EXPANSION OF COMPACT CELL IN HETEROGENEOUS NETWORK SYSTEM

(75) Inventors: Chan-Ho Min, Seoul (KR); Jong-Hyung Kwun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 13/267,259

(22) Filed: Oct. 6, 2011

(65) Prior Publication Data
US 2012/0087247 A1    Apr. 12, 2012

(30) Foreign Application Priority Data
Oct. 8, 2010 (KR) .................. 10-2010-0098129

(51) Int. Cl.
*H04W 4/00* (2009.01)
*H04W 52/24* (2009.01)
*H04W 36/00* (2009.01)

(52) U.S. Cl.
CPC ........ *H04W 52/244* (2013.01); *H04W 36/0083* (2013.01)
USPC ........................................ 370/252; 370/328

(58) Field of Classification Search
USPC ......... 370/235, 237, 252, 254, 311, 331, 332, 370/336, 328; 455/444, 452.1
See application file for complete search history.

(56) References Cited

U.S. PATENT DOCUMENTS

| | | | |
|---|---|---|---|
| 7,286,826 B2 * | 10/2007 | Kim et al. | 455/444 |
| 7,830,847 B1 * | 11/2010 | Sill et al. | 370/338 |
| 8,041,393 B2 * | 10/2011 | Carter et al. | 455/561 |
| 8,223,683 B2 * | 7/2012 | Czaja et al. | 370/315 |
| 8,248,981 B2 * | 8/2012 | Warner et al. | 370/311 |
| 8,280,387 B2 * | 10/2012 | Guvenc et al. | 455/449 |
| 8,385,936 B2 * | 2/2013 | Bai et al. | 455/452.2 |
| 8,391,796 B2 * | 3/2013 | Srinivasan et al. | 455/63.1 |
| 8,498,267 B2 * | 7/2013 | Choi-Grogan et al. | 370/331 |
| 8,565,823 B2 * | 10/2013 | Carter et al. | 455/561 |
| 2007/0298807 A1 | 12/2007 | Yarkosky | |
| 2009/0291690 A1 | 11/2009 | Guvenc et al. | |
| 2011/0110254 A1 * | 5/2011 | Ji et al. | 370/252 |

FOREIGN PATENT DOCUMENTS

EP    1 372 347 A1    12/2003
WO    2009-142954 A1    11/2009

* cited by examiner

*Primary Examiner* — Brian O'Connor
(74) *Attorney, Agent, or Firm* — Jefferson IP Law, LLP

(57) ABSTRACT

An apparatus and method of operating a compact base station for supporting coverage area expansion of a compact cell in a heterogeneous network system are provided. The method includes determining whether an overload takes place in a coverage area where a compact base station and a plurality of terminals communicate using a first Frequency Assignment (FA) in a compact cell, determining whether resources are redistributable using a second FA in a coverage area expanded according to coverage area expansion of the compact cell, and when the resources are redistributable using the second FA in the coverage area expanded according to the coverage area expansion of the compact cell, changing the FA of at least one of the plurality of terminals communicating with the compact base station using the first FA in the compact cell, from the first FA to the second FA.

30 Claims, 16 Drawing Sheets

APPARATUS AND METHOD FOR SUPPORTING COVERAGE EXPANSION OF COMPACT CELL IN HETEROGENEOUS NETWORK SYSTEM

PRIORITY

This application claims the benefit under 35 U.S.C. §119 (a) of a Korean patent application filed in the Korean Intellectual Property Office on Oct. 8, 2010, and assigned Serial No. 10-2010-0098129, the entire disclosure of which is hereby incorporated by reference.

BACKGROUND OF THE INVENTION

1. Field of the Invention

The present invention relates to an efficient resource management method for supporting coverage area expansion of a compact cell without changing 3rd Generation Partnership Project (3GPP) Long Term Evolution (LTE) Release 8/9 standards. More particularly, the present invention relates to a method for supporting handover between a macrocell and a compact cell to minimize interference received from a macro base station to a terminal communicating with a compact base station within a coverage area of an expanded compact cell when the coverage area of the compact cell is expanded in a heterogeneous network system.

2. Description of the Related Art

Since the demand for high-speed data service continues to increase and the high-speed data service is provided through small coverage areas, a compact cell is drawing much attention. The compact cell is a small cell coverage area formed by a compact base station for accessing a mobile communication core network over a broadband network installed indoors such as an office or a house.

Meanwhile, the 3rd Generation Partnership Project (3GPP) Radio Access Network (RAN) WorkingGroup (WG)1 is working on a Heterogeneous Network (HetNet). The HetNet indicates cellular deployment by overlaying compact cells of a smaller coverage area and a smaller power than a macrocell with the macrocell. That is, the cells of different sizes are mixed or overlaid in the HetNet. Yet, all of the cells in the HetNet adopt the same radio transmission technology. Herein, the compact base station can include a pico base station, a femto base station, a micro base station, a relay node, and a Radio Resource Head (RRH).

In general, the pico base station in the HetNet installs an antenna at a lower elevation than the macro base station. As a result, the installation of the pico base station interrupts the smooth macro offload. That is, although the pico base station is installed in the macrocell, the unequal transmit power between the macro base station and the pico base station degrades a cell splitting gain and a load balancing effect between the macrocell and the picocell. For example, in a 3GPP Long Term Evolution (LTE) system, a terminal selects a cell of the greatest Reference Signal Received Power (RSRP) value as its serving cell based on a downlink RSRP, and selects the macrocell using more transmit power than the picocell.

To address this drawback, the 3GPP Release 10 recently considers a technique for expanding the coverage area of the picocell. The picocell coverage area expansion technique expands the coverage area of the picocell by setting a relatively large bias value for the RSRP value of the picocell, and thus the macro offload is achieved and the capacity can be enhanced by installing the pico base station. That is, the picocell coverage area expansion technique can increase the number of users accessing the picocell by changing the serving cell selection criterion of the terminal, and attain the cell splitting gain and the load balancing effect between the macrocell and the picocell by installing the pico base station in the macrocell.

However, the picocell coverage area expansion is subject to the following problems. When the picocell coverage area is expanded, a terminal which communicates with the pico base station in the expanded coverage area receives severe interference from the macro base station and thus cannot smoothly communicate with the pico base station. Specifically, the terminal communicating with the pico base station cannot normally receive a downlink control signal from the pico base station because of the interference from the macro base station.

Thus, when the picocell coverage area is expanded in the HetNet system, what is needed is an efficient resource management method for minimizing the interference received at the terminal communicating with the pico base station from the macro base station within the expanded picocell coverage area.

SUMMARY OF THE INVENTION

Aspects of the present invention are to address the above-mentioned problems and/or disadvantages and to provide at least the advantages described below. Accordingly, an aspect of the present invention is to provide an apparatus and a method for supporting coverage area expansion of a compact cell in a heterogeneous network system.

Another aspect of the present invention is to provide efficient resource management apparatus and method for supporting coverage area expansion of a compact cell in a heterogeneous network system without modifying 3rd Generation Partnership Project (3GPP) Long Term Evolution (LTE) Release 8/9 standards.

Another aspect of the present invention is to provide an apparatus and a method for supporting handover between a macrocell and a compact cell to minimize interference received from a macro base station at a terminal communicating with a compact base station in an expanded coverage area of the compact cell when the coverage area of the compact cell is expanded in a heterogeneous network system.

Another aspect of the present invention is to provide an apparatus and a method for supporting load balancing in a compact cell when coverage area of the compact cell is expanded and overload takes places in the compact cell in a heterogeneous network system.

According to an aspect of the present invention, an operating method of a compact base station for supporting coverage area expansion of a compact cell in a heterogeneous network system is provided. The operating method includes determining whether an overload takes place in a coverage area where a compact base station and a plurality of terminals communicate using a first Frequency Assignment (FA) in a compact cell, when the overload takes place in the coverage area where the compact base station and the plurality of terminals communicate using the first FA in the compact cell, determining whether resources are redistributable using a second FA in a coverage area expanded according to coverage area expansion of the compact cell, and when the resources are redistributable using the second FA in the coverage area expanded according to the coverage area expansion of the compact cell, changing the FA of at least one of the plurality of terminals communicating with the compact base station using the first FA in the compact cell, from the first FA to the second FA, wherein the first FA is a common FA of the compact cell and a macrocell, the second FA is a dedicated FA of the compact cell, and the second FA is used in the coverage area expanded according to the coverage area expansion of the compact cell.

According to another aspect of the present invention, an operating method of a macro base station for supporting coverage area expansion of a compact cell in a heterogeneous network system is provided. The method includes receiving a measurement report message comprising a Reference Signal Received Power (RSRP) measurement value of a second FA used by a neighbor compact base station, from a terminal communicating with the macro base station using a first FA, based on the RSRP measurement value of the second FA used by the neighbor compact base station, determining whether to approve inter-FA handover of the terminal to an expanded compact cell using the second FA, and when determining to approve the inter-FA handover to the expanded compact cell using the second FA, generating a handover command message for instructing the terminal to inter-FA handover to the expanded compact cell using the second FA and sending the handover command message to the terminal, wherein the first FA is a common FA of the compact cell and a macrocell, the second FA is a dedicated FA of the compact cell, and the second FA is used in a coverage area expanded according to coverage area expansion of the compact cell.

According to yet another aspect of the present invention, an operating method of a compact base station for supporting coverage area expansion of a compact cell in a heterogeneous network system is provided. The method includes when communicating with a macro base station using a first FA, measuring RSRP of a second FA used by a neighbor compact base station by performing inter-FA measurement, determining whether the RSRP measurement value of the second FA used by the neighbor compact base station satisfies a measurement report triggering condition, when the RSRP measurement value of the second FA used by the neighbor compact base station satisfies the measurement report triggering condition, generating a measurement report message comprising the RSRP measurement value of the second FA used by the neighbor compact base station and sending the measurement report message to the macro base station, and when receiving a handover command message for instructing the terminal to inter-FA handover to the expanded compact cell using the second FA, from the macro base station, performing the inter-FA handover to the expanded compact cell using the second FA, wherein the first FA is a common FA of the compact cell and a macrocell, the second FA is a dedicated FA of the compact cell, and the second FA is used in a coverage area expanded according to coverage area expansion of the compact cell.

According to still another aspect of the present invention, an operating method of a terminal which communicates with a macro base station, for supporting coverage area expansion of a compact cell in a heterogeneous network system is provided. The method includes receiving a measurement report message comprising a RSRP measurement value of a first FA used by a neighbor macro base station, from a terminal communicating with a compact base station using a second FA, based on the RSRP measurement value of the first FA used by the neighbor macro base station, determining whether to approve inter-FA handover to a macrocell using the first FA, and when determining to approve the inter-FA handover to the macrocell using the first FA, generating a handover command message for instructing the terminal to inter-FA handover to the macrocell using the first FA and sending the handover command message to the terminal, wherein the first FA is a common FA of the compact cell and the macrocell, the second FA is a dedicated FA of the compact cell, and the second FA is used in a coverage area expanded according to coverage area expansion of the compact cell.

According to yet another aspect of the present invention, an operating method of a terminal which communicates with a compact base station, for supporting coverage area expansion of a compact cell in a heterogeneous network system is provided. The method includes when communicating with a compact base station using a second FA, measuring RSRP of a first FA used by a neighbor macro base station by performing inter-FA measurement, determining whether the RSRP measurement value of the first FA used by the neighbor macro base station satisfies a measurement report triggering condition, when the RSRP measurement value of the first FA used by the neighbor macro base station satisfies the measurement report triggering condition, generating a measurement report message comprising the RSRP measurement value of the first FA used by the neighbor macro base station and sending the measurement report message to the compact base station, and when receiving a handover command message for instructing the terminal to inter-FA handover to the macrocell using the first FA, from the compact base station, performing the inter-FA handover to the macrocell using the first FA, wherein the first FA is a common FA of the compact cell and the macrocell, the second FA is a dedicated FA of the compact cell, and the second FA is used in a coverage area expanded according to coverage area expansion of the compact cell.

According to still another aspect of the present invention, an operating method of a compact base station for supporting coverage area expansion of a compact cell in a heterogeneous network system is provided. The method includes receiving a measurement report message comprising a RSRP measurement value of a first FA used by the compact base station, from a terminal communicating with the compact base station using a second FA, based on the RSRP measurement value of the first FA used by the compact base station, determining whether to approve FA change from the second FA to the first FA, and when determining to approve the FA change from the second FA to the first FA, changing the FA used to communicate with the terminal from the second FA to the first FA, wherein the first FA is a common FA of the compact cell and a macrocell, the second FA is a dedicated FA of the compact cell, and the second FA is used in a coverage area expanded according to coverage area expansion of the compact cell.

According to yet another aspect of the present invention, an operating method of a terminal which communicates with a compact base station, for supporting coverage area expansion of a compact cell in a heterogeneous network system is provided. The method includes when communicating with the compact base station using a second FA, measuring RSRP of a first FA used by the compact base station and RSRP of the first FA used by a neighbor macro base station by performing inter-FA measurement, determining whether the RSRP of the first FA used by the compact base station is greater than the RSRP of the first FA used by the macro base station, and when the RSRP of the first FA used by the compact base station is greater than the RSRP of the first FA used by the macro base station, generating a measurement report message comprising the RSRP measurement value of the first FA used by the compact base station and sending the measurement report message to the compact base station, wherein the first FA is a common FA of the compact cell and a macrocell, the second FA is a dedicated FA of the compact cell, and the second FA is used in a coverage area expanded according to coverage area expansion of the compact cell.

According to still another aspect of the present invention, an operating method of a compact base station for supporting coverage area expansion of a compact cell in a heterogeneous network system is provided. The method includes receiving a measurement report message comprising a RSRP measurement value of a second FA used by the compact base station, from a terminal communicating with the compact base station using a first FA, based on the RSRP measurement value of the second FA used by the compact base station, determining whether to approve FA change from the first FA to the second FA, and when determining to approve the FA change from the first FA to the second FA, changing the FA used to communicate with the terminal from the first FA to the second FA, wherein the first FA is a common FA of the compact cell and a macrocell, the second FA is a dedicated FA of the compact cell, and the second FA is used in a coverage area expanded according to coverage area expansion of the compact cell.

According to yet another aspect of the present invention, an operating method of a terminal which communicates with a compact base station, for supporting coverage area expansion of a compact cell in a heterogeneous network system is provided. The method includes when communicating with the compact base station using a first FA, measuring RSRP of a second FA used by the compact base station and RSRP of the first FA used by a neighbor macro base station by performing inter-FA measurement, determining whether the RSRP of the first FA used by the macro base station is greater than the RSRP of the first FA used by the compact base station, and when the RSRP of the first FA used by the macro base station is greater than the RSRP of the first FA used by the compact base station, generating a measurement report message comprising the RSRP measurement value of the second FA used by the compact base station and sending the measurement report message to the compact base station, wherein the first FA is a common FA of the compact cell and a macrocell, the second FA is a dedicated FA of the compact cell, and the second FA is used in a coverage area expanded according to coverage area expansion of the compact cell.

According to still another aspect of the present invention, an apparatus of a compact base station for supporting coverage area expansion of a compact cell in a heterogeneous network system is provided. The apparatus includes a coverage area expansion manager. The coverage area expansion manager determines whether an overload takes place in a coverage area where a compact base station and a plurality of terminals communicate using a first FA in a compact cell, when the overload takes place in the coverage area where the compact base station and the plurality of terminals communicate using the first FA in the compact cell, determines whether resources are redistributable using a second FA in a coverage area expanded according to coverage area expansion of the compact cell, and, when the resources are redistributable using the second FA in the coverage area expanded according to the coverage area expansion of the compact cell, changes the FA of at least one of the plurality of terminals communicating with the compact base station using the first FA in the compact cell, from the first FA to the second FA. The first FA is a common FA of the compact cell and a macrocell, the second FA is a dedicated FA of the compact cell, and the second FA is used in the coverage area expanded according to the coverage area expansion of the compact cell.

According to yet another aspect of the present invention, an apparatus of a macro base station for supporting coverage area expansion of a compact cell in a heterogeneous network system is provided. The apparatus includes a reception modem for receiving a measurement report message comprising a RSRP measurement value of a second FA used by a neighbor compact base station, from a terminal communicating with a macro base station using a first FA, a coverage area expansion manager for, based on the RSRP measurement value of the second FA used by the neighbor compact base station, determining whether to approve inter-FA handover to an expanded compact cell using the second FA, a message generator for, when determining to approve the inter-FA handover to the expanded compact cell using the second FA, generating a handover command message for instructing the terminal to inter-FA handover to the expanded compact cell using the second FA, and a transmission modem for sending the generated handover command message to the terminal, wherein the first FA is a common FA of the compact cell and a macrocell, the second FA is a dedicated FA of the compact cell, and the second FA is used in a coverage area expanded according to coverage area expansion of the compact cell.

According to still another aspect of the present invention, an apparatus of a terminal which communicates with a macro base station, for supporting coverage area expansion of a compact cell in a heterogeneous network system is provided. The apparatus includes a coverage area expansion manager for, when communicating with a macro base station using a first FA, measuring RSRP of a second FA used by a neighbor compact base station by performing inter-FA measurement, and for determining whether the RSRP measurement value of the second FA used by the neighbor compact base station satisfies a measurement report triggering condition, a message generator for, when the RSRP measurement value of the second FA used by the neighbor compact base station satisfies the measurement report triggering condition, generating a measurement report message comprising the RSRP measurement value of the second FA used by the neighbor compact base station, and a transmission modem for sending the generated measurement report message to the macro base station, wherein, when receiving a handover command message for instructing the terminal to inter-FA handover to the expanded compact cell using the second FA, from the macro base station, the coverage area expansion manager performs the inter-FA handover to the expanded compact cell using the second FA, and wherein the first FA is a common FA of the compact cell and a macrocell, the second FA is a dedicated FA of the compact cell, and the second FA is used in a coverage area expanded according to coverage area expansion of the compact cell.

According to yet another aspect of the present invention, an apparatus of a compact base station for supporting coverage area expansion of a compact cell in a heterogeneous network system is provided. The apparatus includes a reception modem for receiving a measurement report message comprising a RSRP measurement value of a first FA used by a neighbor macro base station, from a terminal communicating with a compact base station using a second FA, a coverage area expansion manager for, based on the RSRP measurement value of the first FA used by the neighbor macro base station, determining whether to approve inter-FA handover to a macrocell using the first FA, a message generator for, when determining to approve the inter-FA handover to the macrocell using the first FA, generating a handover command message for instructing the terminal to inter-FA handover to the macrocell using the first FA, and a transmission modem for sending the generated handover command message to the terminal, wherein the first FA is a common FA of the compact cell and a macrocell, the second FA is a dedicated FA of the compact cell, and the second FA is used in a coverage area expanded according to coverage area expansion of the compact cell.

According to still another aspect of the present invention, an apparatus of a terminal which communicates with a compact base station, for supporting coverage area expansion of a compact cell in a heterogeneous network system is provided. The apparatus includes a coverage area expansion manager for, when communicating with a compact base station using a second FA, measuring RSRP of a first FA used by a neighbor macro base station by performing inter-FA measurement, and for determining whether the RSRP measurement value of the first FA used by the neighbor macro base station satisfies a measurement report triggering condition, a message generator for, when the RSRP measurement value of the first FA used by the neighbor macro base station satisfies the measurement report triggering condition, generating a measurement report message comprising the RSRP measurement value of the first FA used by the neighbor macro base station, and a transmission modem for sending the generated measurement report message to the compact base station, wherein, when receiving a handover command message for instructing the terminal to inter-FA handover to the macrocell using the first FA, from the compact base station, the coverage area expansion manager performs the inter-FA handover to the macrocell using the first FA, and wherein the first FA is a common FA of the compact cell and the macrocell, the second FA is a dedicated FA of the compact cell, and the second FA is used in a coverage area expanded according to coverage area expansion of the compact cell.

According to yet another aspect of the present invention, an apparatus of a compact base station for supporting coverage area expansion of a compact cell in a heterogeneous network system is provided. The apparatus includes a reception modem for receiving a measurement report message comprising a RSRP measurement value of a first FA used by the compact base station, from a terminal communicating with the compact base station using a second FA, and a coverage area expansion manager for, based on the RSRP measurement value of the first FA used by the compact base station, determining whether to approve FA change from the second FA to the first FA, and for changing the FA used to communicate with the terminal from the second FA to the first FA when determining to approve the FA change from the second FA to the first FA, wherein the first FA is a common FA of the compact cell and a macrocell, the second FA is a dedicated FA of the compact cell, and the second FA is used in a coverage area expanded according to coverage area expansion of the compact cell.

According to still another aspect of the present invention, an apparatus of a terminal which communicates with a compact base station, for supporting coverage area expansion of a compact cell in a heterogeneous network system is provided. The apparatus includes a coverage area expansion manager for, when communicating with the compact base station using a second FA, measuring RSRP of a first FA used by the compact base station and RSRP of the first FA used by a neighbor macro base station by performing inter-FA measurement, and for determining whether the RSRP measurement value of the first FA used by the compact base station is greater than the RSRP measurement value of the first FA used by the macro base station, a message generator for, when the RSRP measurement value of the first FA used by the compact base station is greater than the RSRP measurement value of the first FA used by the macro base station, generating a measurement report message comprising the RSRP measurement value of the first FA used by the compact base station, and a transmission modem for sending the generated measurement report message to the compact base station, wherein the first FA is a common FA of the compact cell and a macrocell, the second FA is a dedicated FA of the compact cell, and the second FA is used in a coverage area expanded according to coverage area expansion of the compact cell.

According to yet another aspect of the present invention, an apparatus of a compact base station for supporting coverage area expansion of a compact cell in a heterogeneous network system is provided. The apparatus a reception modem for receiving a measurement report message comprising a RSRP measurement value of a second FA used by the compact base station, from a terminal communicating with the compact base station using a first FA, and a coverage area expansion manager for, based on the RSRP measurement value of the second FA used by the compact base station, determining whether to approve FA change from the first FA to the second FA, and for changing the FA used to communicate with the terminal from the first FA to the second FA when determining to approve the FA change from the first FA to the second FA, wherein the first FA is a common FA of the compact cell and a macrocell, the second FA is a dedicated FA of the compact cell, and the second FA is used in a coverage area expanded according to coverage area expansion of the compact cell.

According to still another aspect of the present invention, an apparatus of a terminal which communicates with a compact base station, for supporting coverage area expansion of a compact cell in a heterogeneous network system is provided. The apparatus includes a coverage area expansion manager for, when communicating with the compact base station using a first FA, measuring RSRP of a second FA used by the compact base station and RSRP of the first FA used by a neighbor macro base station by performing inter-FA measurement, and for determining whether the RSRP measurement value of the first FA used by the macro base station is greater than the RSRP measurement value of the first FA used by the compact base station, a message generator for, when the RSRP of the first FA used by the macro base station is greater than the RSRP measurement value of the first FA used by the compact base station, generating a measurement report message comprising the RSRP measurement value of the second FA used by the compact base station, and a transmission modem for sending the generated measurement report message to the compact base station, wherein the first FA is a common FA of the compact cell and a macrocell, the second FA is a dedicated FA of the compact cell, and the second FA is used in a coverage area expanded according to coverage area expansion of the compact cell.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
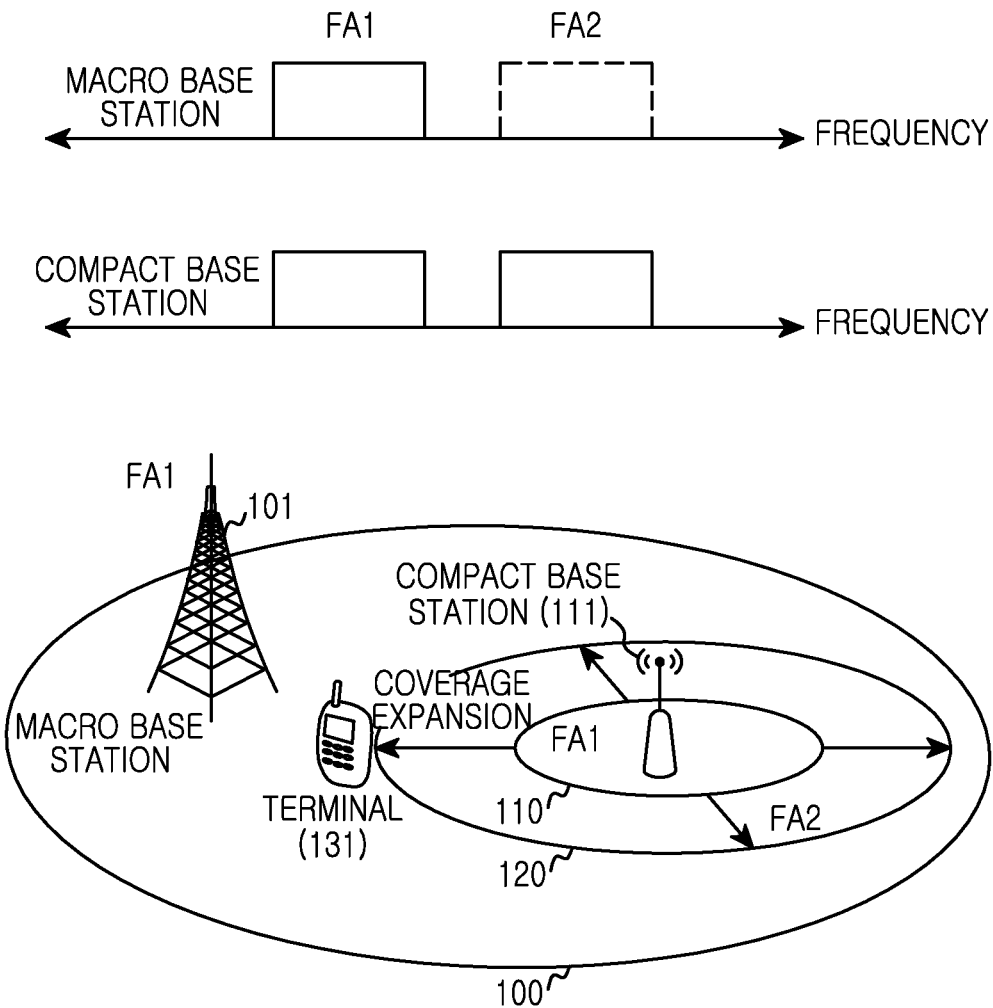
FIG. 1 is a diagram of a heterogeneous network system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an efficient resource management method for supporting coverage area expansion of a compact cell in a heterogeneous network system without modifying 3rd Generation Partnership Project (3GPP) Long Term Evolution (LTE) Release 8/9 standards. In particular, exemplary embodiments of the present invention provide a method for supporting handover between a macrocell and a compact cell to minimize interference received from a macro base station to a terminal communicating with a compact base station in an expanded coverage area of the compact cell when the coverage area of the compact cell is expanded in a heterogeneous network system. Also, exemplary embodiments of the present invention provide a method for supporting load balancing in a compact cell when coverage area of the compact cell is expanded and an overload takes place in the compact cell in a heterogeneous network system.

Hereinafter, a 3GPP LTE system is exemplified as the system, but it should be noted that the present invention is applicable to every system for supporting the coverage area expansion of the compact cell in the heterogeneous network including the macrocell and the compact cell.

FIG. 1 depicts a heterogeneous network system according to an exemplary embodiment of the present invention.

Referring to FIG. 1, a macro base station 101 has a wide coverage area (i.e., a macrocell) 100, within which a coverage area (i.e., a compact cell) 110 of at least one compact base station 111 is included. The macro base station 101 provides a mobile Internet service to a terminal 131 accessing the macrocell 100 using a common Frequency Assignment (FA) 1.

The coverage area (i.e., the compact cell) 110 of the compact base station 111 is smaller than the coverage area (i.e., the macrocell) 100 of the macro base station 101. In addition, the compact base station 111 uses less transmit power, and provides the mobile Internet service to the terminal 131 accessing the compact cell 110 using the common FA1. Herein, the compact base station 111 may be implemented using any one of a pico base station, a femto base station, a micro base station, a relay node, a Radio Resource Head (RRH), etc.

The compact base station 111 can expand the coverage area of the compact cell 110 by setting a large bias value in a Reference Signal Received Power (RSRP) value of the compact cell 110. In this case, the compact base station 111 provides the mobile Internet service to the terminal 131 accessing the expanded compact cell 120 using a dedicated FA2 in the expanded coverage area (i.e., the expanded compact cell) 120 of the compact base station 111.

Herein, for the common FA1 of the macro base station 101 and the compact base station 111, both of the macro base station 101 and the compact base station 111 use their full power. Likewise, for the dedicated FA2 of the compact base station 111, the compact base station 111 uses its full power.

Figure 2:
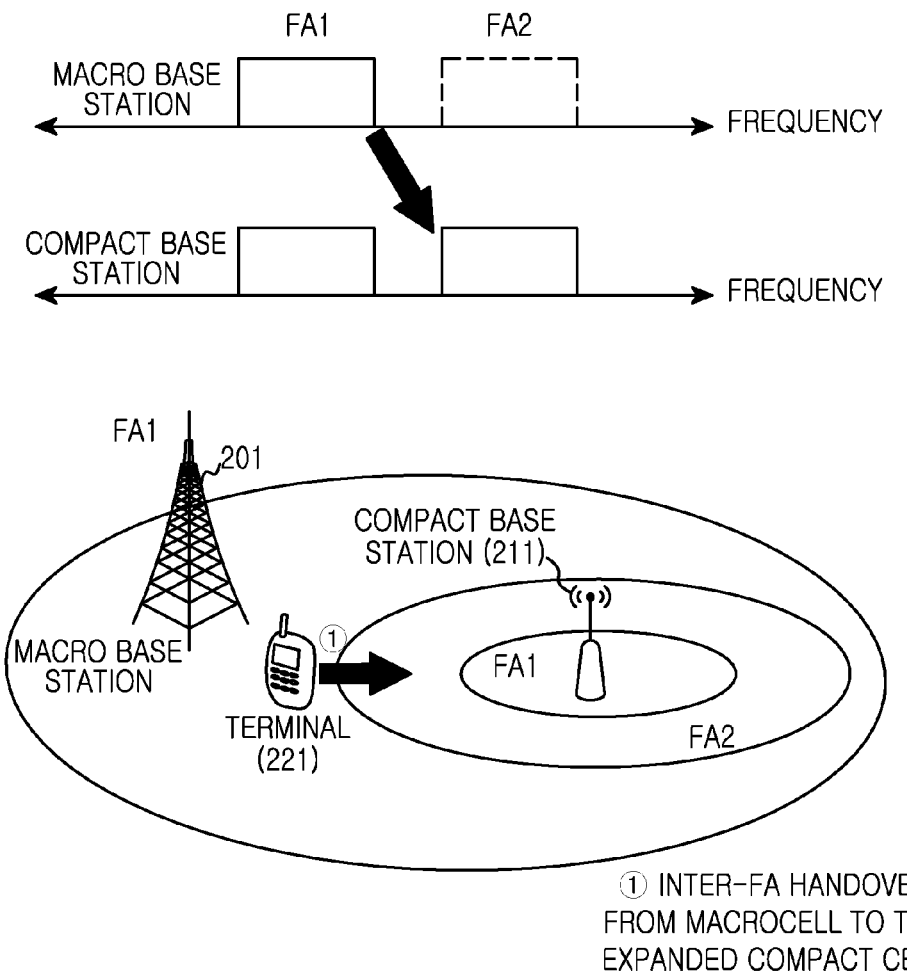
FIG. 2 is a diagram of inter-Frequency Assignment (FA) handover from a macrocell to an expanded compact cell in a heterogeneous network system according to an exemplary embodiment of the present invention.

FIG. 2 is a diagram of inter-FA handover from a macrocell to an expanded compact cell in a heterogeneous network system according to an exemplary embodiment of the present invention.

Referring to FIG. 2, a terminal 221 which is communicating with a macro base station 201 using the FA1 measures the RSRP of the FA2 used by a neighbor compact base station 211 by conducting inter-FA measurement, and determines whether the RSRP measurement value of the FA2 used by the neighbor compact base station 211 satisfies a measurement report triggering condition. When the RSRP measurement value of the FA2 used by the neighbor compact base station 211 satisfies the measurement report triggering condition, the terminal 221 generates a measurement report message including the RSRP measurement value of the FA2 used by the neighbor compact base station 211 and sends the generated message to the macro base station 201.

Based on the RSRP measurement value of the FA2 used by the neighbor compact base station 211, the macro base station 201 determines whether to approve the inter-FA handover to the expanded compact cell using the FA2. Upon determining to approve the inter-FA handover to the expanded compact cell using the FA2, the macro base station 201 generates a handover command message for instructing the terminal 221 to conduct the inter-FA handover to the expanded compact cell using the FA2, and sends the generated message to the terminal 221.

Upon receiving the handover command message, the terminal 221 hands over to the expanded compact cell using the FA2.

Figure 3:
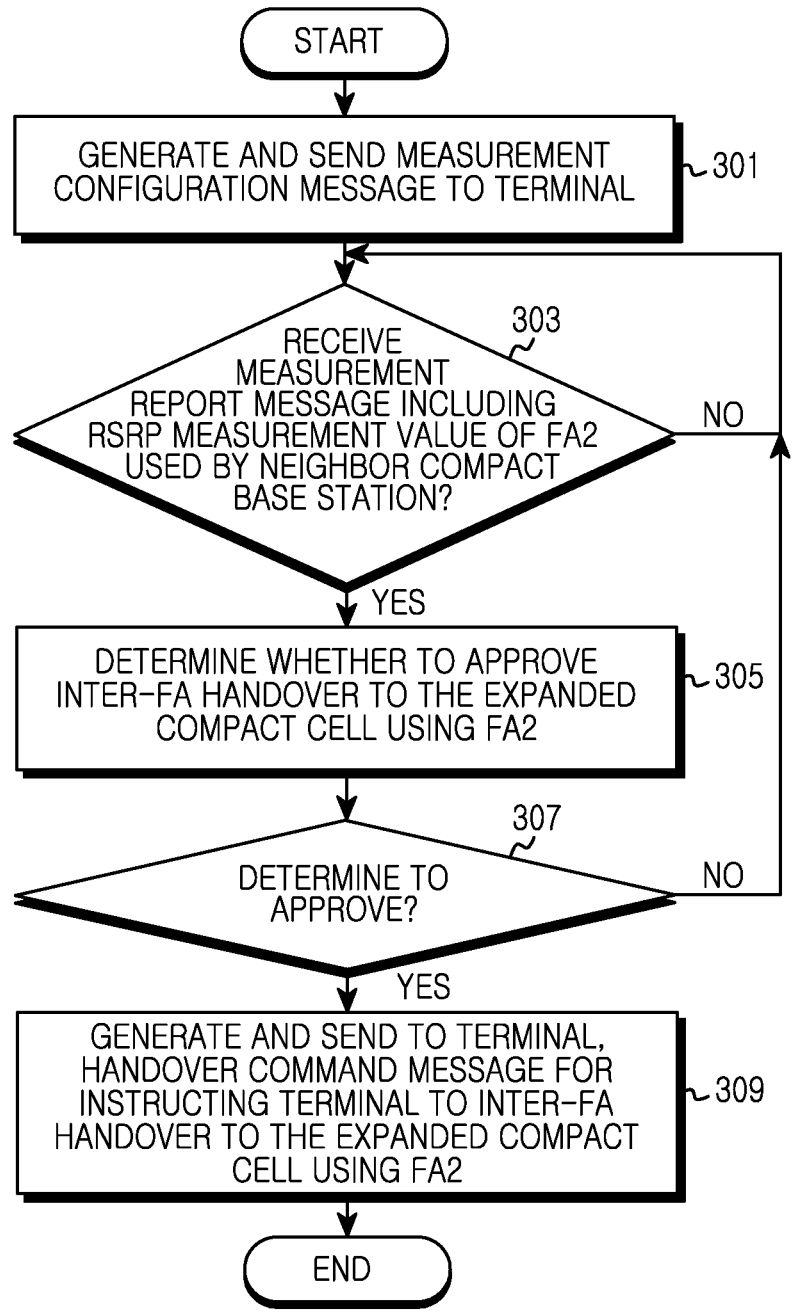
FIG. 3 is a flowchart of operations of a macro base station for supporting an inter-FA handover from a macrocell to an expanded compact cell in a heterogeneous network system according to an exemplary embodiment of the present invention.

FIG. 3 is a flowchart of operations of a macro base station for supporting an inter-FA handover from a macrocell to an expanded compact cell in a heterogeneous network system according to an exemplary embodiment of the present invention.

Referring to FIG. 3, the macro base station communicating with the terminal using the FA1 periodically generates and sends a measurement configuration message to the terminal communicating with the macro base station in step 301. Herein, the measurement configuration message includes parameters used for the inter-FA measurement. In the exemplary embodiments of the present invention, the measurement configuration message includes an Ofn value per cell and inter-FA measurement gap information. Herein, the Ofn value indicates an offset value based on a carrier frequency of the corresponding cell, and the inter-FA measurement gap information indicates information relating to a measurement gap allocated to the corresponding terminal. The measurement gap allocated to the corresponding terminal indicates a gap between termination timing of communication with a serving base station and measurement timing of signal from a neighbor base station with respect to the corresponding terminal.

In step 303, the macro base station determines whether the measurement report message is received from the terminal. Herein, the measurement report message includes the RSRP measurement value of the FA2 used by the neighbor compact base station, which is obtained by the terminal through the inter-FA measurement based on the measurement configuration message, and is received in the measurement gap allocated through the measurement gap information.

When receiving the measurement report message from the terminal in step 303, the macro base station determines based on the RSRP measurement value of the FA2 used by the neighbor compact base station, whether to approve the inter-FA handover to the expanded compact cell using the FA2 in step 305.

In step 307, the macro base station checks whether it determines to approve the inter-FA handover to the expanded compact cell using the FA2.

Upon determining to approve the inter-FA handover to the expanded compact cell using the FA2 in step 307, the macro base station generates the handover command message for instructing the terminal to inter-FA handover to the expanded compact cell using the FA2 and sends the generated message to the terminal in step 309.

In contrast, upon determining to reject the inter-FA handover to the expanded compact cell using the FA2 in step 307, the macro base station returns to step 303.

Next, the macro base station finishes this process.

Figure 4:
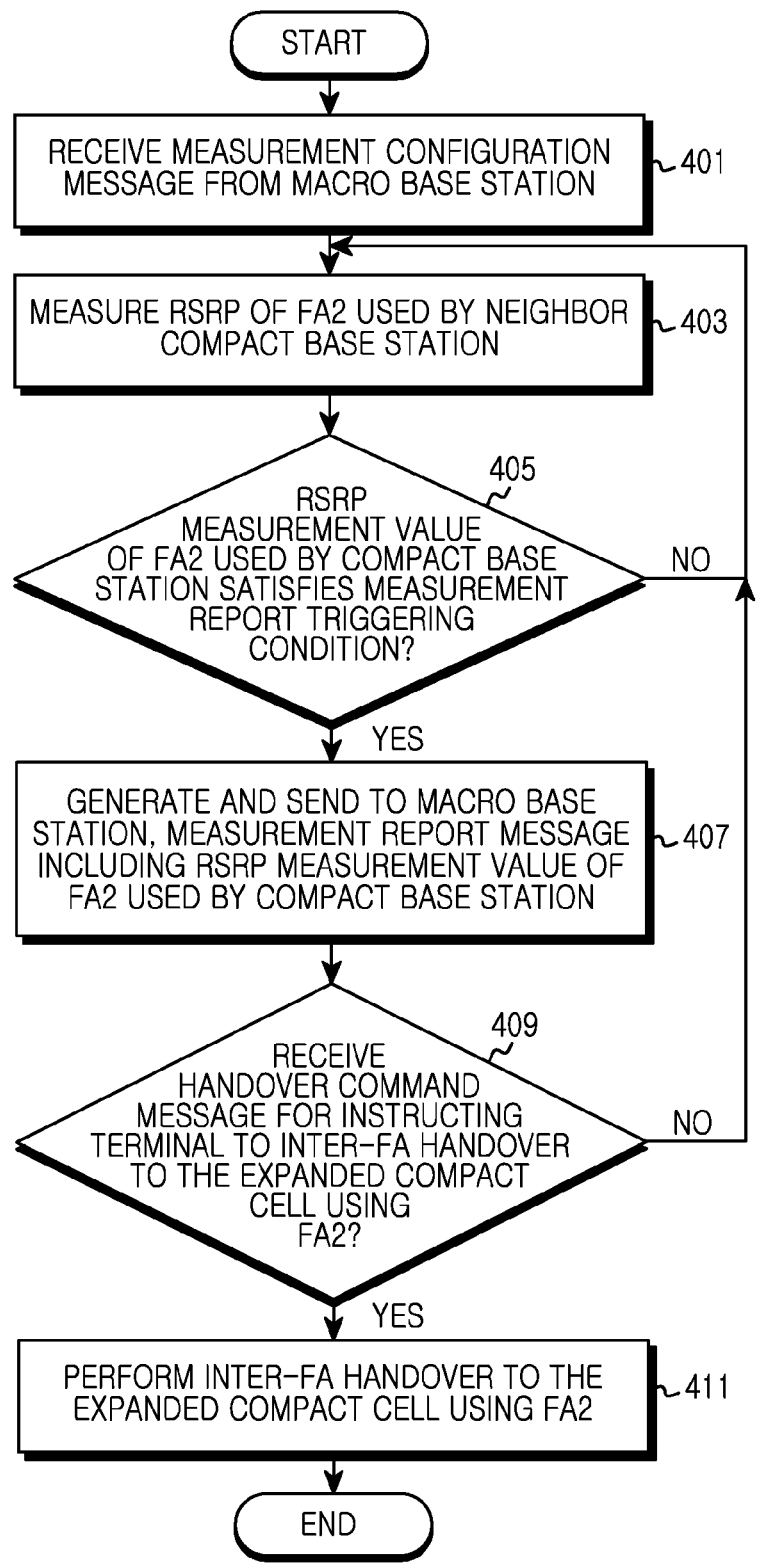
FIG. 4 is a flowchart of operations of a terminal communicating with a macro base station for supporting an inter-FA handover from a macrocell to an expanded compact cell in a heterogeneous network system according to an exemplary embodiment of the present invention.

FIG. 4 is a flowchart of operations of a terminal communicating with a macro base station for supporting an inter-FA handover from a macrocell to an expanded compact cell in a heterogeneous network system according to an exemplary embodiment of the present invention.

Referring to FIG. 4, the terminal communicating with the macro base station using the FA1 periodically receives the measurement configuration message from the macro base station in step 401. Herein, the measurement configuration message includes the parameters used for the inter-FA measurement. In the exemplary embodiments of the present invention, the measurement configuration message includes the Ofn value per cell and the inter-FA measurement gap information. Herein, the Ofn value indicates the offset value based on the carrier frequency of the corresponding cell, and the inter-FA measurement gap information indicates the information relating to the measurement gap allocated to the corresponding terminal.

In step 403, the terminal measures the RSRP of the FA2 used by the neighbor compact base station through the periodic inter-FA measurement based on the received measurement configuration message. Alternatively, when the RSRP measurement value of the FA1 used by the macro base station is smaller than a reference value, the terminal can measure the RSRP of the FA2 used by the neighbor compact base station through the inter-FA measurement based on the received measurement configuration message.

In step 405, the terminal determines whether the RSRP measurement value of the FA2 used by the neighbor compact base station satisfies the measurement report triggering condition. The LTE system has diverse measurement report triggering conditions. An example of the measurement report triggering condition is an A3 event, which is given by Equation 1.

$$Mn+Ofn+Ocn-Hys>Ms+Ofs+Ocs+Off \quad \text{Equation 1}$$

In Equation 1, Mn denotes the RSRP measurement value (dB) of the neighbor cell and Ms denotes the RSRP measurement value (dB) of a serving cell. Ofn denotes an offset value (dB) based on the carrier frequency of the neighbor cell and Ofs denotes an offset value (dB) based on the carrier frequency of the serving cell. Ocn denotes an offset value (dB) used to control a signal level of the neighbor cell in the handover and Ocs denotes an offset value (dB) used to control a signal level of the serving cell in the handover. Hys denotes an offset value (dB) to reflect common characteristic of every event including the A3 event and Off denotes an offset value (dB) to reflect characteristics of the A3 event. In FIG. 4, the neighbor cell is the neighbor compact base station using the FA2, and the serving cell is the macro base station using the FA1.

Herein, for the inter-FA handover from the macrocell using the FA1 to the expanded compact cell using the FA2, the other offset values (i.e., Ofs, Ocn, Ocs, Hys, and Off) except for Ofn in Equation 1 are set to the value of 0 dB, and Ofn is set to a positive value (e.g., 24 dB). Herein, Ofn can be obtained from the Ofn value per cell in the measurement configuration message. The positive value of Ofn implies that the measurement report triggering is performed when a value smaller than the RSRP measurement value of the serving base station by the offset value is smaller than the RSRP measurement value of the neighbor base station, not that the measurement report triggering is performed when the RSRP measurement value of the serving base station is smaller than the RSRP measurement value of the neighbor base station. In other words, the positive value of Ofn implies that the measurement report triggering is not performed when the RSRP measurement value of the serving base station is smaller than the RSRP measurement value of the neighbor base station but the measurement report triggering is performed when a value of the RSRP measurement value of the serving base station minus the offset value is smaller than the RSRP measurement value of the neighbor base station. That is, it implies that the handover point (timing point) from the macro base station to the compact base station is given before a reference handover point (i.e., a handover point when the neighbor compact base station uses the FA1), and that the coverage area of the compact base station is expanded to be larger than a reference coverage area (i.e., a coverage area when the neighbor compact base station uses the FA1).

When the RSRP measurement value of the FA2 used by the neighbor compact base station satisfies the measurement report triggering condition in step 405, the terminal generates the measurement report message including the RSRP measurement value of the FA2 used by the neighbor compact base station and sends the generated message to the macro base station in step 407. Herein, the measurement report message is transmitted over the measurement gap allocated through the measurement gap information.

In step 409, the terminal determines whether the handover command message for instructing the terminal to inter-FA handover to the expanded compact cell using the FA2 is received from the macro base station.

Upon receiving the handover command message for instructing the terminal to inter-FA handover to the expanded compact cell using the FA2 from the macro base station in step 409, the terminal conducts the inter-FA handover to the expanded compact cell using the FA2 in step 411.

In contrast, when not receiving the handover command message for instructing the terminal to inter-FA handover to the expanded compact cell using the FA2 from the macro base station in step 409, the terminal returns to step 403.

When the RSRP measurement value of the FA2 used by the neighbor compact base station does not satisfy the measurement report triggering condition in step 405, the terminal returns to step 403.

Next, the terminal finishes this process.

Figure 5:
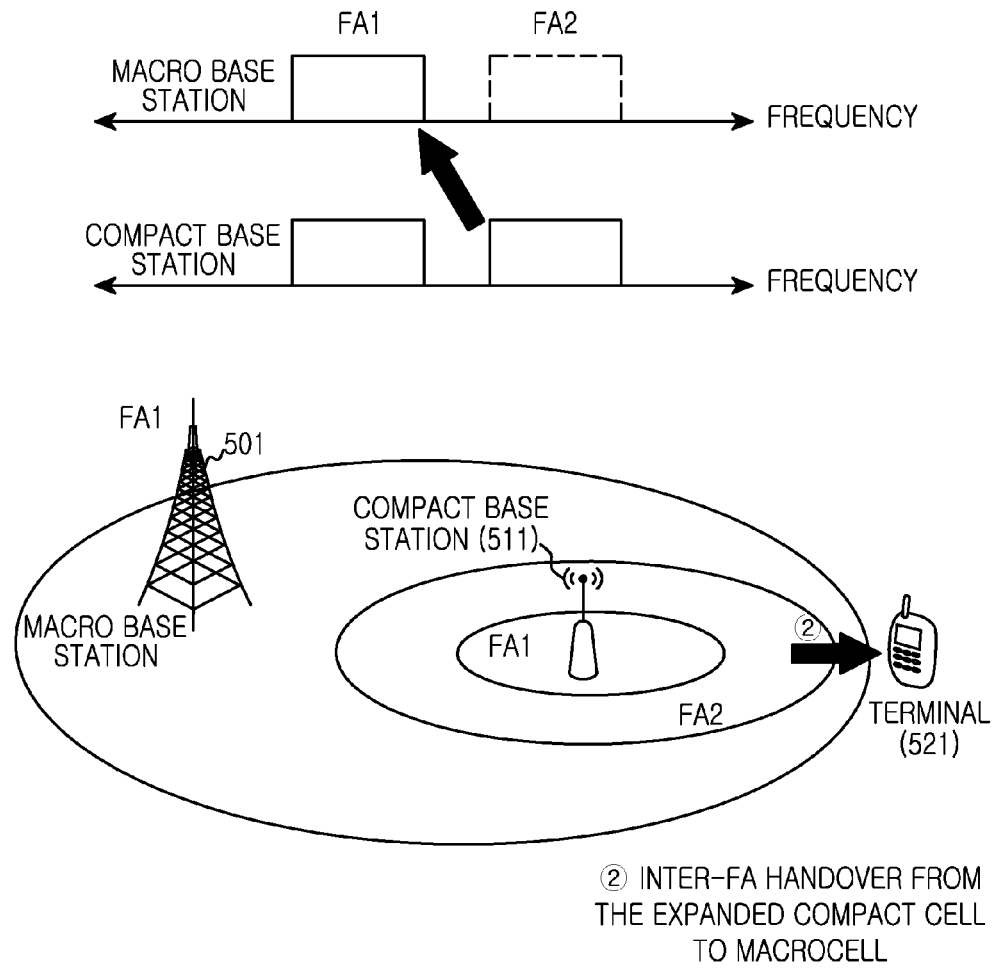
FIG. 5 is a diagram of inter-FA handover from an expanded compact cell to a macrocell in a heterogeneous network system according to an exemplary embodiment of the present invention.

FIG. 5 is a diagram of an inter-FA handover from an expanded compact cell to a macrocell in a heterogeneous network system according to an exemplary embodiment of the present invention.

Referring to FIG. 5, a terminal 521 which is communicating with a compact base station 511 using the FA2 in the expanded compact cell measures the RSRP of the FA1 used by a neighbor macro base station 501 by conducting the inter-FA measurement, and determines whether the RSRP measurement value of the FA1 used by the neighbor macro base station 501 satisfies the measurement report triggering condition. When the RSRP measurement value of the FA1 used by the neighbor macro base station 501 satisfies the measurement report triggering condition, the terminal 521 generates the measurement report message including the RSRP measurement value of the FA1 used by the neighbor macro base station 501 and sends the generated message to the compact base station 511.

Based on the RSRP measurement value of the FA1 used by the neighbor macro base station 501, the compact base station 511 determines whether to approve the inter-FA handover to the macrocell using the FA1. Upon determining to approve the inter-FA handover to the macrocell using the FA1, the compact base station 511 generates the handover command message for instructing the terminal to inter-FA handover to the macrocell using the FA1, and sends the generated message to the terminal 521.

Upon receiving the handover command message, the terminal 521 performs the inter-FA handover to the macrocell using the FA1.

Figure 6:
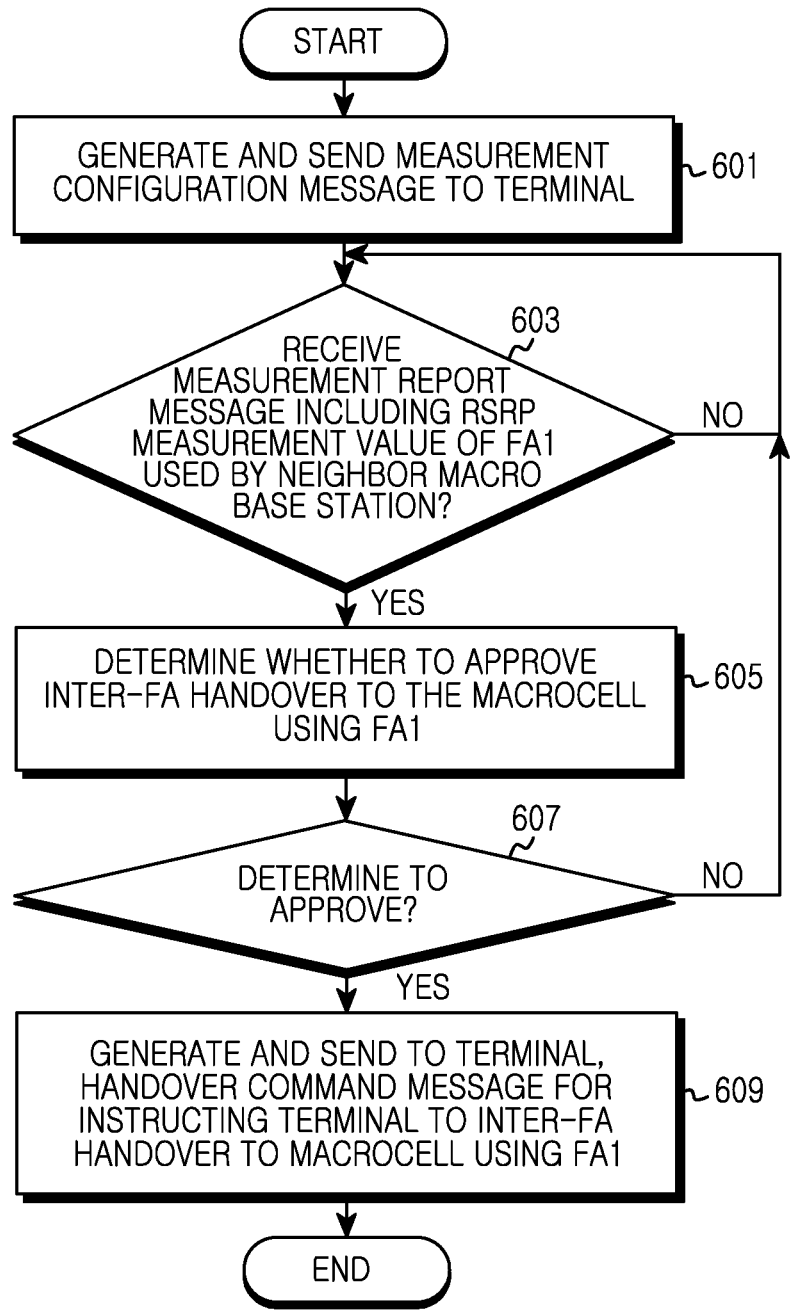
FIG. 6 is a flowchart of operations of a compact base station for supporting an inter-FA handover from an expanded compact cell to a macrocell in a heterogeneous network system according to an exemplary embodiment of the present invention.

FIG. 6 is a flowchart of operations of a compact base station for supporting an inter-FA handover from an expanded compact cell to a macrocell in a heterogeneous network system according to an exemplary embodiment of the present invention.

Referring to FIG. 6, the compact base station communicating with the terminal using the FA2 in the expanded compact cell periodically generates and sends the measurement configuration message to the terminal communicating with the compact base station in step 601. Herein, the measurement configuration message includes the parameters used for the inter-FA measurement. In the exemplary embodiments of the present invention, the measurement configuration message includes the Ofn value per cell and the inter-FA measurement gap information. Herein, the Ofn value indicates the offset value based on the carrier frequency of the corresponding cell, and the inter-FA measurement gap information indicates the information relating to the measurement gap allocated to the corresponding terminal.

In step 603, the compact base station determines whether the measurement report message is received from the terminal. Herein, the measurement report message includes the RSRP measurement value of the FA1 used by the neighbor macro base station, which is obtained by the terminal through the inter-FA measurement based on the measurement configuration message, and is received over the measurement gap allocated through the measurement gap information.

When receiving the measurement report message from the terminal in step 603, the compact base station determines based on the RSRP measurement value of the FA1 used by the neighbor macro base station, whether to approve the inter-FA handover to the macrocell using the FA1 in step 605.

In step 607, the compact base station checks whether it determines to approve the inter-FA handover to the macrocell using the FA1.

Upon determining to approve the inter-FA handover to the macrocell using the FA1 in step 607, the compact base station generates the handover command message for instructing the terminal to inter-FA handover to the macrocell using the FA1 and sends the generated message to the terminal in step 609.

In contrast, upon determining to reject the inter-FA handover to the macrocell using the FA1 in step 607, the compact base station returns to step 603.

Next, the compact base station finishes this process.

Figure 7:
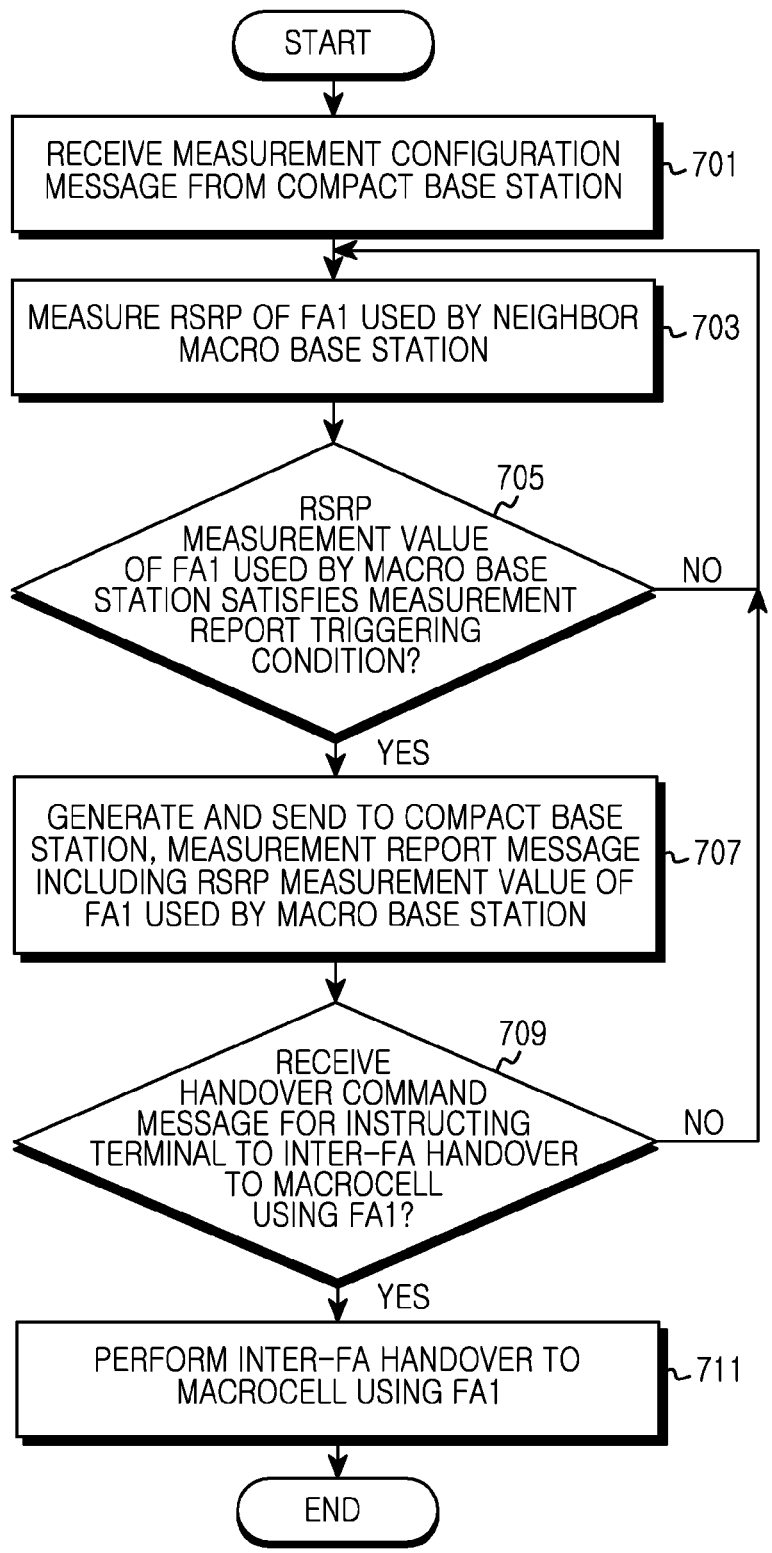
FIG. 7 is a flowchart of operations of the terminal communicating with a compact base station for supporting an inter-FA handover from an expanded compact cell to a macrocell in a heterogeneous network system according to an exemplary embodiment of the present invention.

FIG. 7 is a flowchart of a terminal communicating with a compact base station for supporting an inter-FA handover from an expanded compact cell to a macrocell in a heterogeneous network system according to an exemplary embodiment of the present invention.

Referring to FIG. 7, the terminal communicating with the compact base station using the FA2 in the expanded compact cell periodically receives the measurement configuration message from the compact base station in step 701. Herein, the measurement configuration message includes the parameters used for the inter-FA measurement. In the exemplary embodiments of the present invention, the measurement configuration message includes the Ofn value per cell and the inter-FA measurement gap information. Herein, the Ofn value indicates the offset value based on the carrier frequency of the corresponding cell, and the inter-FA measurement gap information indicates the information relating to the measurement gap allocated to the corresponding terminal.

In step 703, the terminal measures the RSRP of the FA1 used by the neighbor macro base station through the periodic inter-FA measurement based on the received measurement configuration message. Alternatively, when the RSRP measurement value of the FA2 used by the compact base station is smaller than the reference value, the terminal can measure the RSRP of the FA1 used by the neighbor macro base station through the inter-FA measurement based on the received measurement configuration message.

In step 705, the terminal determines whether the RSRP measurement value of the FA1 used by the neighbor macro base station satisfies the measurement report triggering condition, such as the measurement report triggering condition of Equation 1. Herein, for the inter-FA handover from the expanded compact cell using the FA2 to the macrocell using the FA1, the other offset values (i.e., Ofs, Ocn, Ocs, Hys, and Off) except for Ofn in Equation 1 are set to the value of 0 dB, and Ofn is set to a negative value (e.g., −24 dB). Herein, Ofn can be obtained from the Ofn value per cell in the measurement configuration message. The negative value of Ofn implies that the measurement report triggering is performed when a value greater than the RSRP measurement value of the serving base station by the offset value is smaller than the RSRP measurement value of the neighbor base station, not that the measurement report triggering is performed when the RSRP measurement value of the serving base station is smaller than the RSRP measurement value of the neighbor base station. In other words, the negative value of Ofn implies that the measurement report triggering is not performed when the RSRP measurement value of the serving base station is smaller than the RSRP measurement value of the neighbor base station but the measurement report triggering is performed when a value of the RSRP measurement value of the serving base station plus the offset value is smaller than the RSRP measurement value of the neighbor base station, That is, it implies that the handover point (timing point) from the compact base station to the macro base station is given after the reference handover point (i.e., the handover point when the compact base station uses the FA1), and that the coverage area of the compact base station is expanded to be larger than the reference coverage area (i.e., the coverage area when the compact base station uses the FA1).

When the RSRP measurement value of the FA1 used by the neighbor macro base station satisfies the measurement report triggering condition in step 705, the terminal generates the measurement report message including the RSRP measurement value of the FA1 used by the neighbor macro base station and sends the generated message to the compact base station in step 707. Herein, the measurement report message is transmitted over the measurement gap allocated through the measurement gap information.

In step 709, the terminal determines whether the handover command message for instructing the terminal to inter-FA handover to the macrocell using the FA1 is received from the compact base station.

Upon receiving the handover command message for instructing the terminal to inter-FA handover to the macrocell using the FA1 from the compact base station in step 709, the terminal conducts the inter-FA handover to the macrocell using the FA1 in step 711.

In contrast, when not receiving the handover command message for instructing the terminal to inter-FA handover to the macrocell using the FA1 from the compact base station in step 709, the terminal returns to step 703.

When the RSRP measurement value of the FA1 used by the neighbor macro base station does not satisfy the measurement report triggering condition in step 705, the terminal returns to step 703.

Next, the terminal finishes this process.

Figure 8:
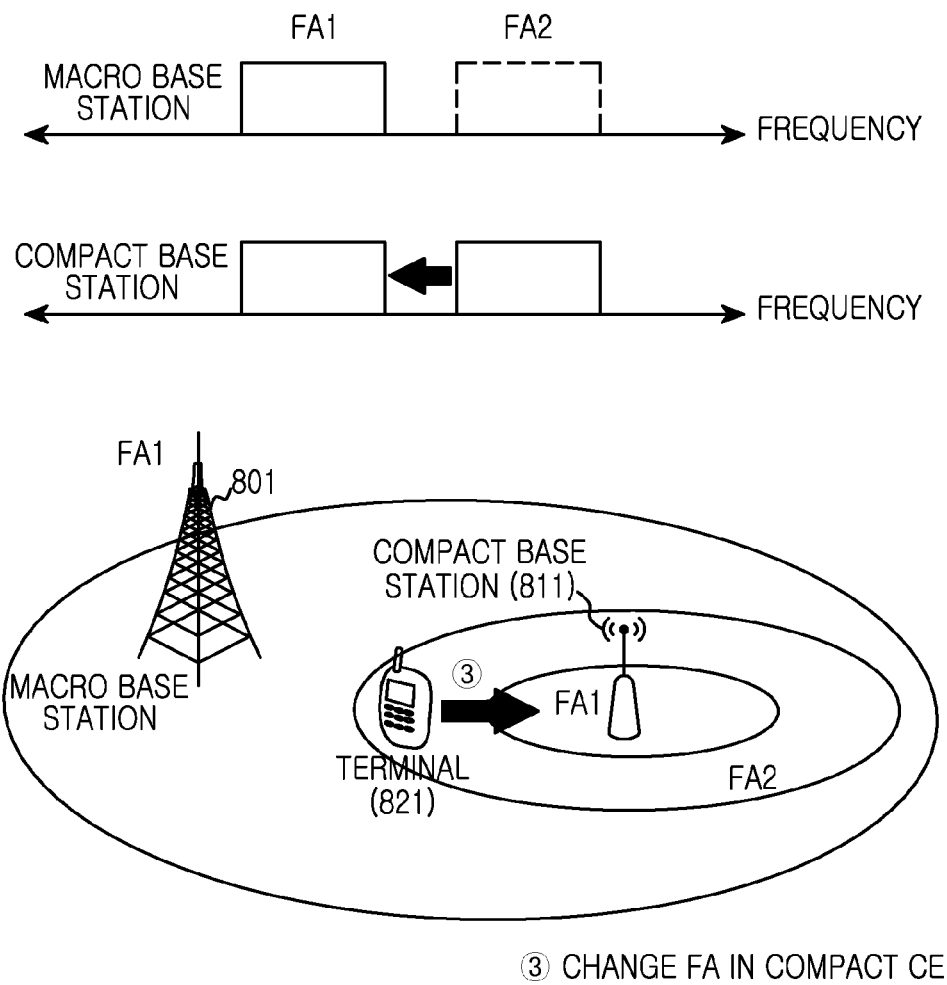
FIG. 8 is a diagram of FA change from an FA2 to an FA1 of a terminal communicating with a compact base station in a compact cell in a heterogeneous network system according to an exemplary embodiment of the present invention.

FIG. 8 is a diagram of FA change from an FA2 to an FA1 of a terminal communicating with a compact base station in a compact cell of a heterogeneous network system according to an exemplary embodiment of the present invention.

Referring to FIG. 8, a terminal 821 which is communicating with a compact base station 811 using the FA2 in the expanded compact cell measures the RSRP of the FA1 used by the compact base station 811 and the RSRP of the FA1 used by a neighbor macro base station 801 by conducting the inter-FA measurement, and determines whether the RSRP measurement value of the FA1 used by the compact base station 811 is greater than the RSRP measurement value of the FA1 used by the macro base station 801. When the RSRP measurement value of the FA1 used by the compact base station 811 is greater than the RSRP measurement value of the FA1 used by the macro base station 801, the terminal 821 generates the measurement report message including the RSRP measurement value of the FA1 used by the compact base station 811 and sends the generated message to the compact base station 811.

Based on the RSRP measurement value of the FA1 used by the compact base station 811, the compact base station 811 determines whether to approve the change from the FA2 to the FA1 with respect to the FA used to communicate with the terminal 821. When determining to approve the FA change from the FA2 to the FA1, the compact base station 811 changes its FA used to communicate with the terminal 821 from the FA2 to the FA1, generates an FA change message for informing the terminal of this change, and sends the generated message to the terminal 821.

Upon receiving the FA change message, the compact base station 811 communicates with the terminal 821 over the FA1.

Figure 9:
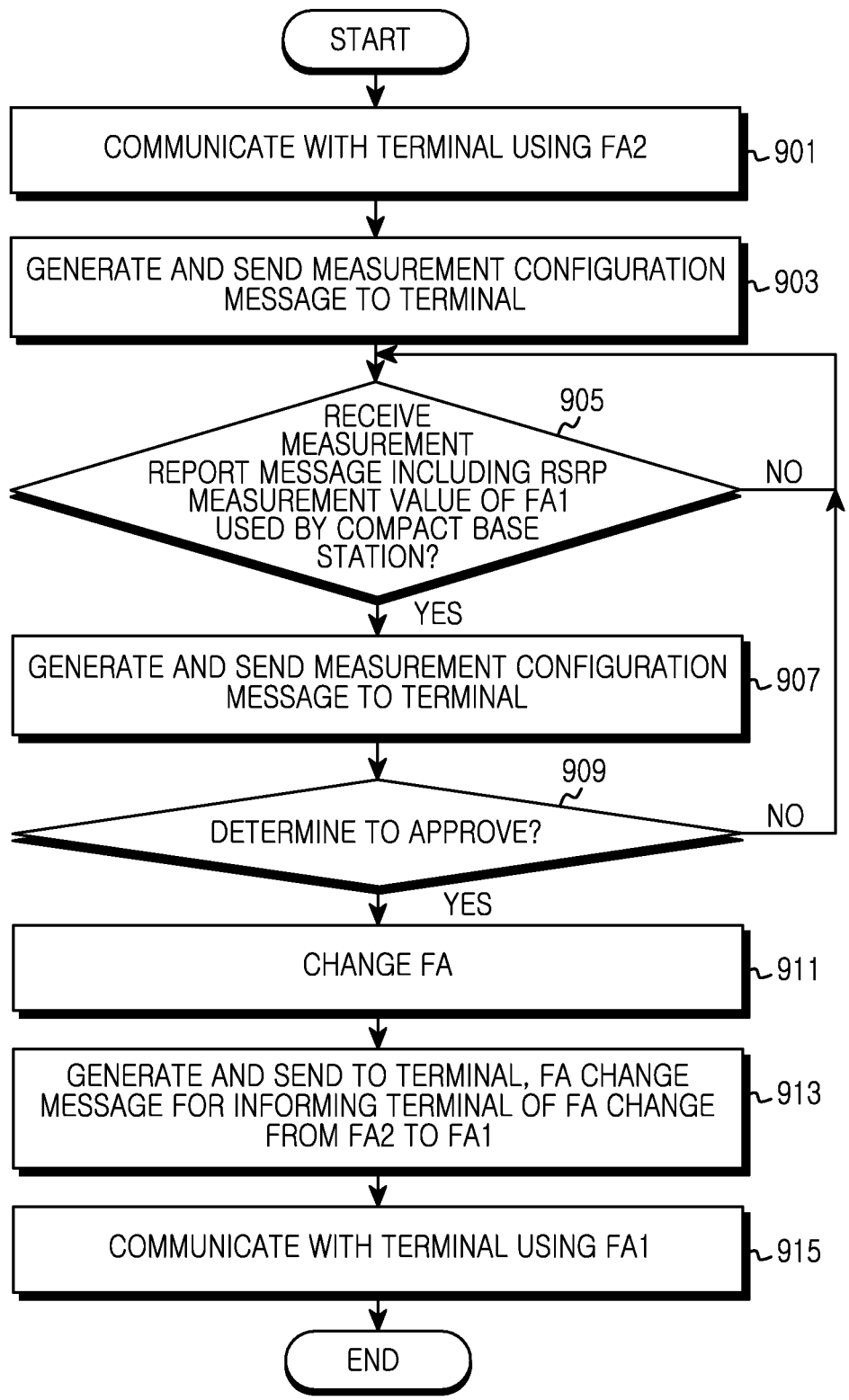
FIG. 9 is a flowchart of operations of a compact base station for supporting a terminal communicating with a compact base station to change an FA from an FA2 to an FA1 in a compact cell of a heterogeneous network system according to an exemplary embodiment of the present invention.

FIG. 9 is a flowchart of operations of a compact base station for supporting a terminal communicating with a compact base station to change an FA from an FA2 to an FA1 in a compact cell of a heterogeneous network system according to an exemplary embodiment of the present invention.

Referring to FIG. 9, the compact base station communicates with the terminal using the FA2 in the expanded compact cell in step 901.

In step 903, the compact base station periodically generates and transmits the measurement configuration message to the terminal. Herein, the measurement configuration message includes the parameters used for the inter-FA measurement. In the exemplary embodiments of the present invention, the measurement configuration message includes the inter-FA measurement gap information. The inter-FA measurement gap information indicates the information relating to the measurement gap allocated to the corresponding terminal.

In step 905, the compact base station determines whether the measurement report message is received from the terminal. Herein, the measurement report message includes the RSRP measurement value of the FA1 used by the compact base station, which is obtained by the terminal through the inter-FA measurement based on the measurement configuration message, and is received over the measurement gap allocated through the measurement gap information.

When receiving the measurement report message from the terminal in step 905, the compact base station determines whether to approve the FA change from the FA2 to the FA1, based on the RSRP measurement value of the FA1 used by the compact base station in step 907.

In step 909, the compact base station checks whether it determines to approve the FA change from the FA2 to the FA1.

When determining to approve the FA change from the FA2 to the FA1 in step 909, the compact base station changes the FA used to communicate with the terminal, from the FA2 to the FA1 in step 911 and proceeds to step 913.

In step 913, the compact base station generates the FA change message for informing the terminal of the FA change from the FA2 to the FA1 and sends the generated message to the terminal.

In step 915, the compact base station communicates with the terminal using the FA1.

In contrast, when determining to reject the FA change from the FA2 to the FA1 in step 909, the compact base station returns to step 905.

Next, the compact base station finishes this process.

Figure 10:
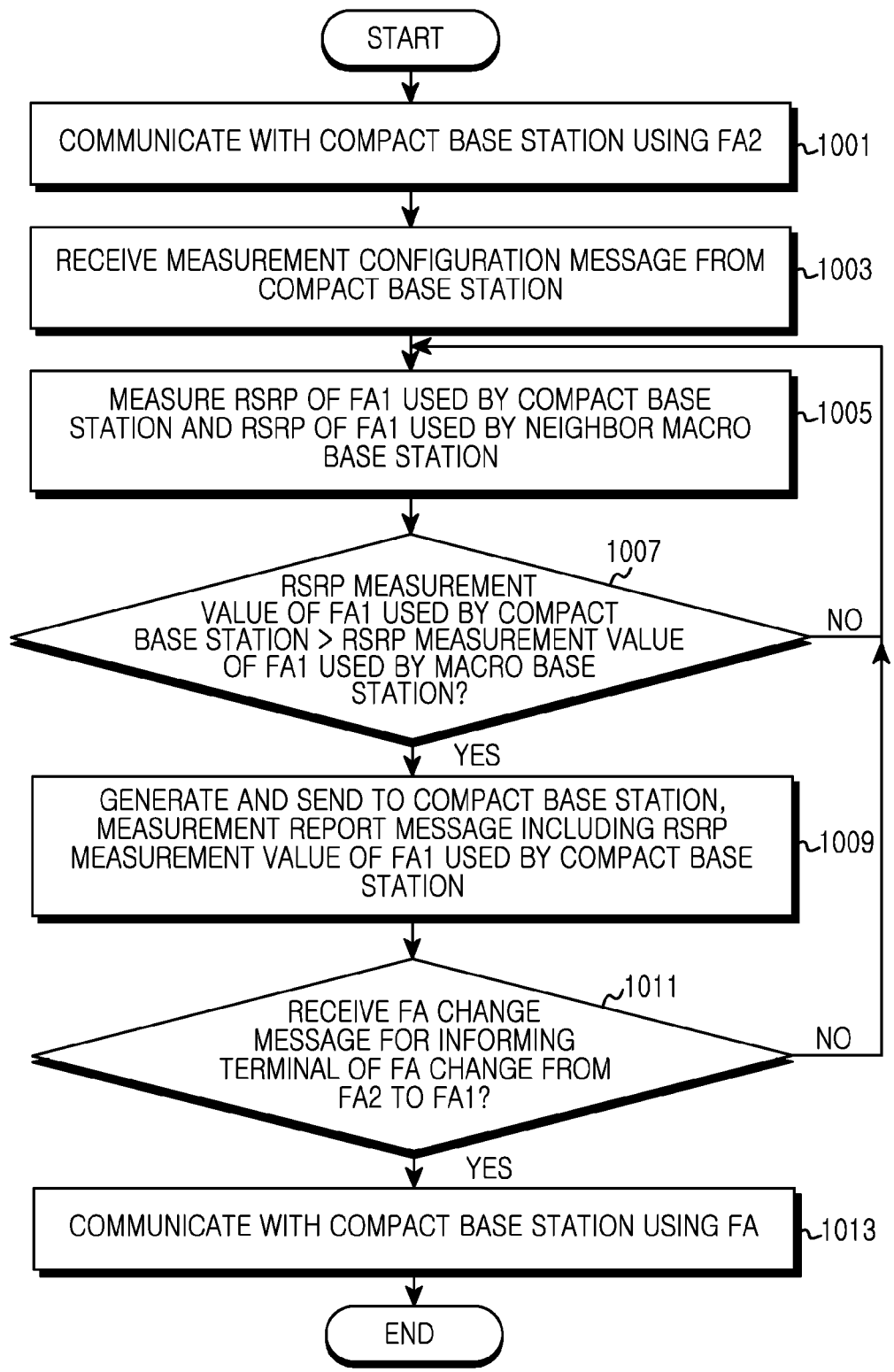
FIG. 10 is a flowchart of operations of a terminal communicating with a compact base station for supporting an FA change from an FA2 to an FA1 in a compact cell of a heterogeneous network system according to an exemplary embodiment of the present invention.

FIG. 10 is a flowchart of operations of a terminal communicating with a compact base station for supporting an FA change from an FA2 to an FA1 in a compact cell of a heterogeneous network system according to an exemplary embodiment of the present invention.

Referring to FIG. 10, the terminal communicates with the compact base station using the FA2 in the expanded compact cell in step 1001.

In step 1003, the terminal periodically receives the measurement configuration message from the compact base station. Herein, the measurement configuration message includes the parameters used for the inter-FA measurement. In the exemplary embodiments of the present invention, the measurement configuration message includes the inter-FA measurement gap information. The inter-FA measurement gap information indicates the information relating to the measurement gap allocated to the corresponding terminal.

Based on the received measurement configuration message, the terminal measures the RSRP of the FA1 used by the compact base station and the RSRP of the FA1 used by the neighbor macro base station by periodically conducting the inter-FA measurement in step 1005. Alternatively, when the RSRP measurement value of the FA2 used by the compact base station is smaller than the reference value, the terminal can measure the RSRP of the FA1 used by the compact base station and the RSRP of the FA1 used by the neighbor macro base station by performing the inter-FA measurement based on the received measurement configuration message.

In step 1007, the terminal determines whether the RSRP measurement value of the FA1 used by the compact base station is greater than the RSRP measurement value of the FA1 used by the macro base station.

When determining that the RSRP measurement value of the FA1 used by the compact base station is greater than the RSRP measurement value of the FA1 used by the neighbor macro base station in step 1007, the terminal generates the measurement report message including the RSRP measurement value of the FA1 used by the compact base station and sends the generated message to the compact base station in step 1009, and then proceeds to step 1011. Herein, the measurement report message is transmitted over the measurement gap allocated through the measurement gap information.

In step 1011, the terminal determines whether the FA change message for informing the terminal that the FA used to communicate with the compact base station is changed from the FA2 to the FA1 is received.

When receiving the FA change message for informing the terminal that the FA used to communicate with the compact base station is changed from the FA2 to the FA1 in step 1011, the terminal communicates with the compact base station using the FA1 in step 1013.

In contrast, when not receiving the FA change message for informing the terminal that the FA used to communicate with the compact base station is changed from the FA2 to the FA1 in step 1011, the terminal returns to step 1005.

When determining that the RSRP measurement value of the FA1 used by the compact base station is not greater than the RSRP measurement value of the FA1 used by the macro base station in step 1007, the terminal returns to step 1005.

Next, the terminal finishes this process.

Figure 11:
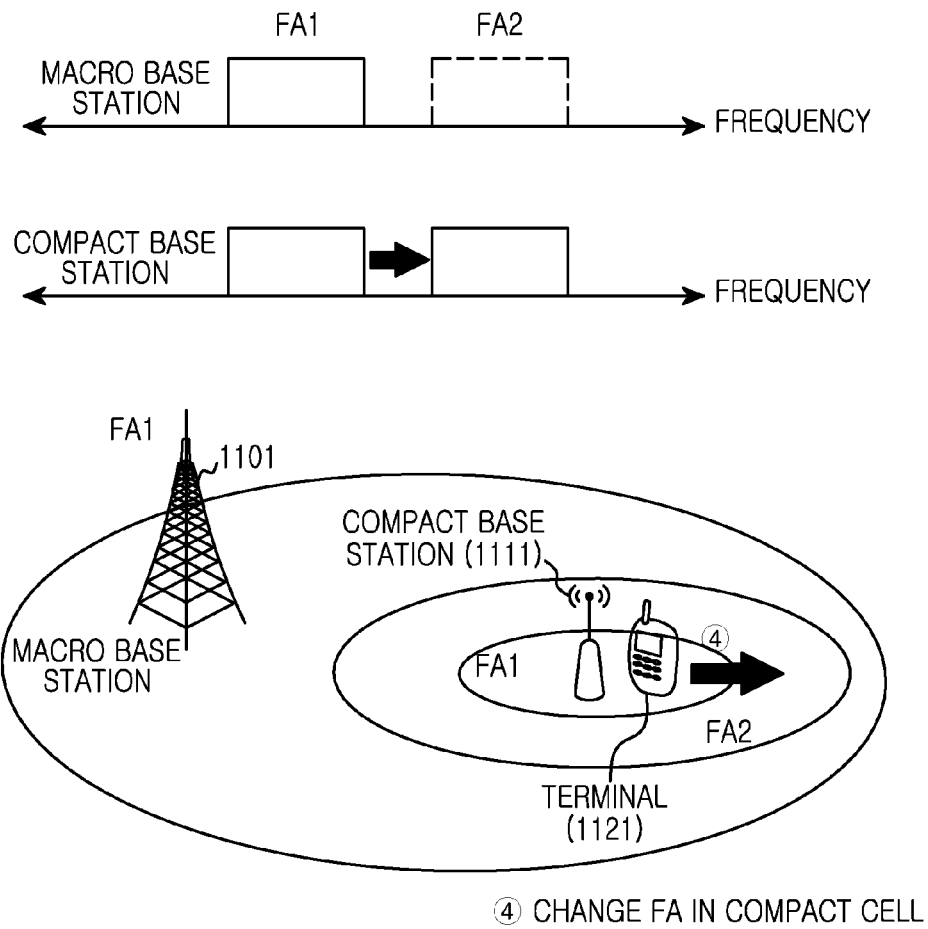
FIG. 11 is a diagram of an FA change from an FA1 to the FA2 of a terminal communicating with a compact base station in a compact cell of a heterogeneous network system according to an exemplary embodiment of the present invention.

FIG. 11 is a diagram of an FA change from an FA1 to an FA2 of a terminal communicating with a compact base station in a compact cell of a heterogeneous network system according to an exemplary embodiment of the present invention.

Referring to FIG. 11, a terminal 1121 which is communicating with a compact base station 1111 using the FA1 in the expanded compact cell measures the RSRP of the FA2 used by the compact base station 1111 and the RSRP of the FA1 used by a neighbor macro base station 1101 by conducting the inter-FA measurement, and determines whether the RSRP measurement value of the FA1 used by the macro base station 1101 is greater than the RSRP measurement value of the FA1 used by the compact base station 1111. When the RSRP measurement value of the FA1 used by the macro base station 1101 is greater than the RSRP measurement value of the FA1 used by the compact base station 1111, the terminal 1121 generates the measurement report message including the RSRP measurement value of the FA2 used by the compact base station 1111 and sends the generated message to the compact base station 1111.

Based on the RSRP measurement value of the FA2 used by the compact base station 1111, the compact base station 1111 determines whether to approve the change from the FA1 to the FA2 with respect to the FA used to communicate with the terminal 1121. When determining to approve the FA change from the FA1 to the FA2, the compact base station 1111 changes its FA used to communicate with the terminal 1121 from the FA1 to the FA2, generates the FA change message for informing the terminal of this change, and sends the generated message to the terminal 1121.

Upon receiving the FA change message, the compact base station 1111 communicates with the terminal 1121 over the FA2.

Figure 12:
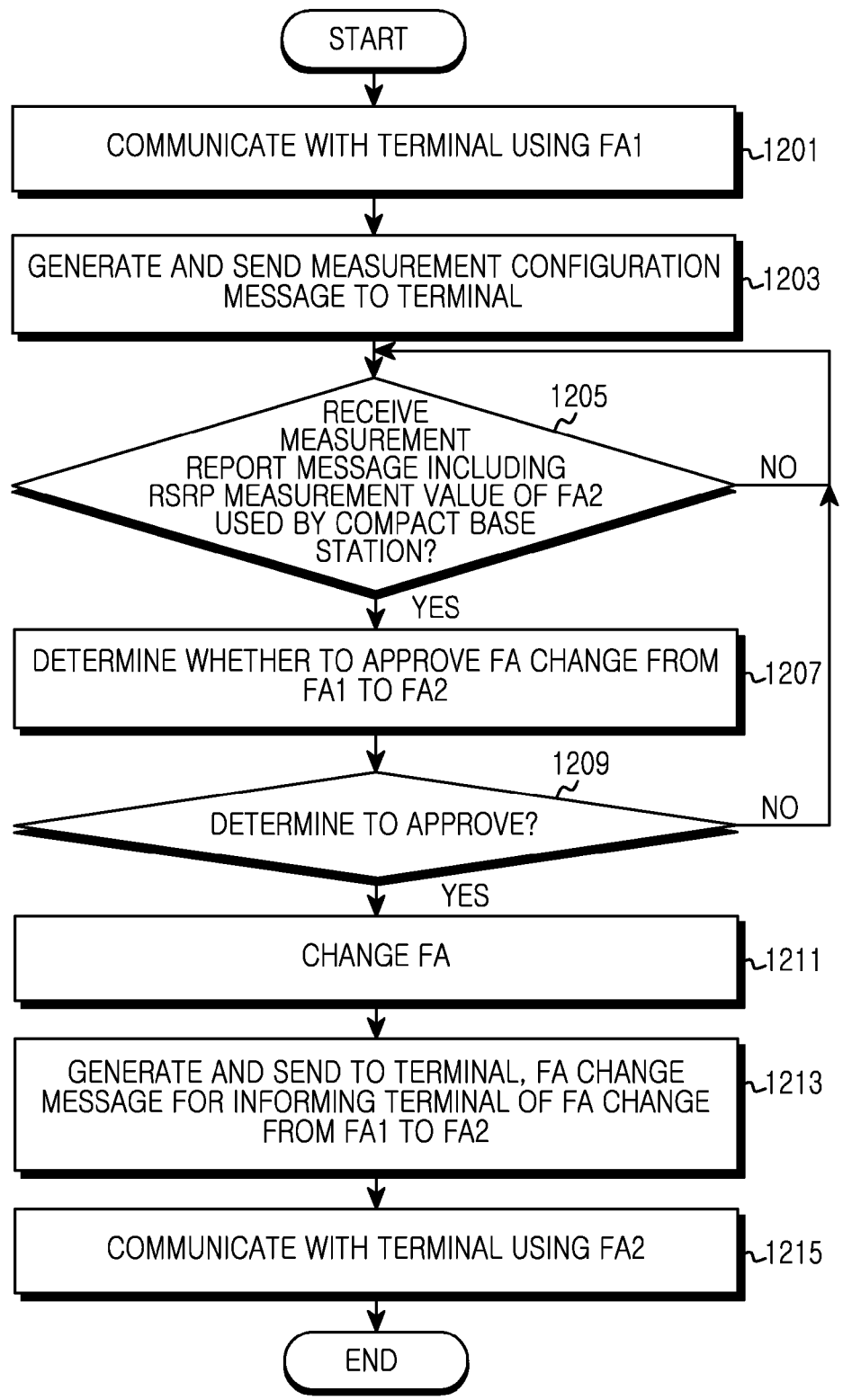
FIG. 12 is a flowchart of operations of a compact base station for supporting a terminal communicating with a compact base station to change an FA from an FA1 to an FA2 in a compact cell of a heterogeneous network system according to an exemplary embodiment of the present invention.

FIG. 12 is a flowchart of operations of a compact base station for supporting a terminal communicating with a compact base station to change an FA from an FA1 to an FA2 in a compact cell of a heterogeneous network system according to an exemplary embodiment of the present invention.

Referring to FIG. 12, the compact base station communicates with the terminal using the FA1 in the expanded compact cell in step 1201.

In step 1203, the compact base station periodically generates and transmits the measurement configuration message to the terminal. Herein, the measurement configuration message includes the parameters used for the inter-FA measurement. In the exemplary embodiments of the present invention, the measurement configuration message includes the inter-FA measurement gap information. The inter-FA measurement gap information indicates the information relating to the measurement gap allocated to the corresponding terminal.

In step 1205, the compact base station determines whether the measurement report message is received from the terminal. Herein, the measurement report message includes the RSRP measurement value of the FA2 used by the compact base station, which is obtained by the terminal through the inter-FA measurement based on the measurement configuration message, and is received over the measurement gap allocated through the measurement gap information.

Upon receiving the measurement report message from the terminal in step 1205, the compact base station determines whether to approve the FA change from the FA1 to the FA2, based on the RSRP measurement value of the FA2 used by the compact base station in step 1207.

In step 1209, the compact base station checks whether it determines to approve the FA change from the FA1 to the FA2.

When determining to approve the FA change from the FA1 to the FA2 in step 1209, the compact base station changes the FA used to communicate with the terminal, from the FA1 to the FA2 in step 1211 and proceeds to step 1213.

In step 1213, the compact base station generates the FA change message for informing the terminal of the FA change from the FA1 to the FA2 and sends the generated message to the terminal.

In step 1215, the compact base station communicates with the terminal using the FA2.

In contrast, when determining to reject the FA change from the FA1 to the FA2 in step 1209, the compact base station returns to step 1205.

Next, the compact base station finishes this process.

Figure 13:
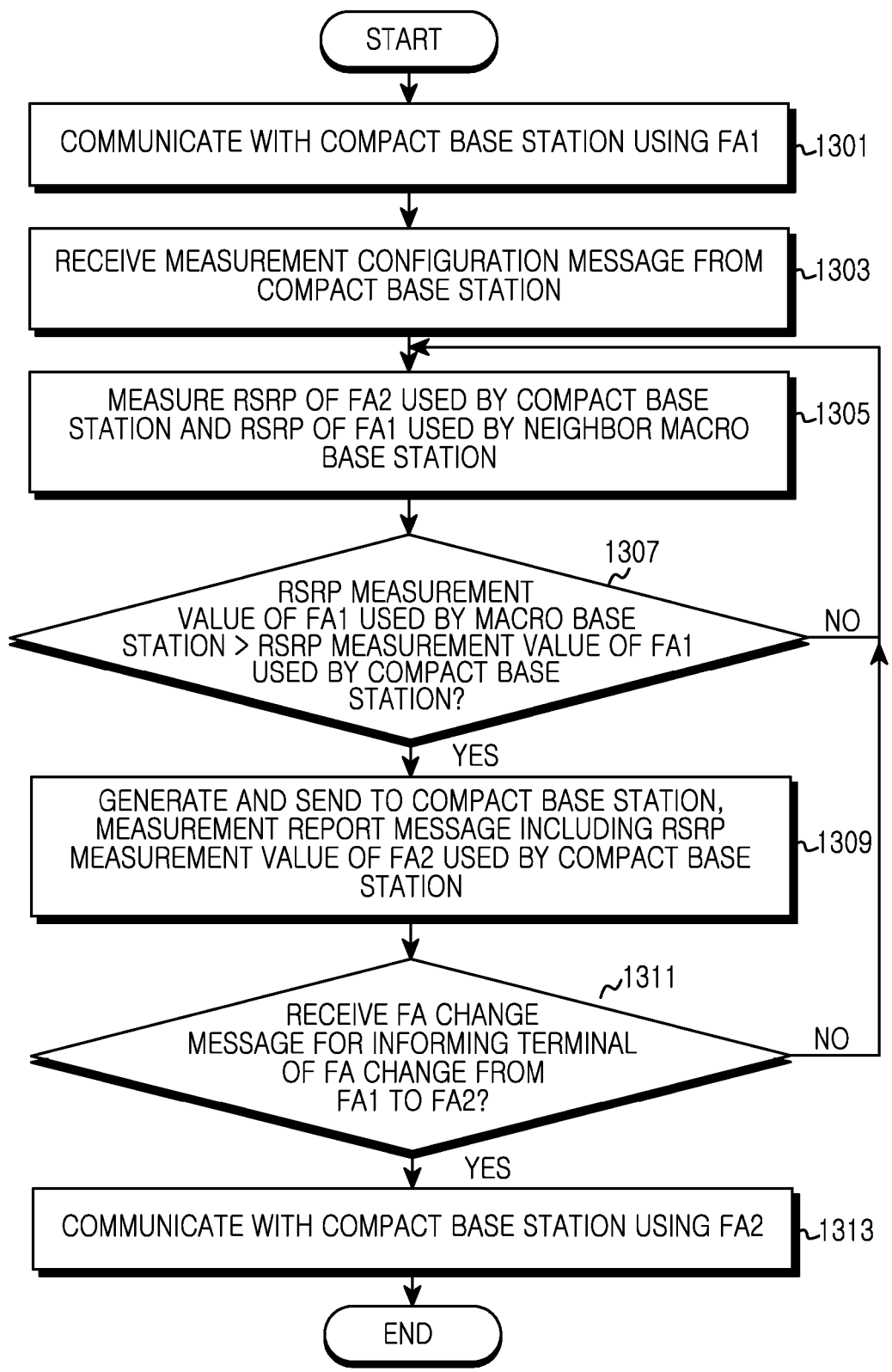
FIG. 13 is a flowchart of operations of a terminal communicating with a compact base station for supporting an FA change from an FA1 to an FA2 in a compact cell of a heterogeneous network system according to an exemplary embodiment of the present invention.

FIG. 13 is a flowchart of operations of a terminal communicating with a compact base station for supporting an FA change from an FA1 to an FA2 in a compact cell of a heterogeneous network system according to an exemplary embodiment of the present invention.

Referring to FIG. 13, the terminal communicates with the compact base station using the FA1 within the expanded compact cell in step 1301.

In step 1303, the terminal periodically receives the measurement configuration message from the compact base station. Herein, the measurement configuration message includes the parameters used for the inter-FA measurement. In the exemplary embodiments of the present invention, the measurement configuration message includes the inter-FA measurement gap information. Herein, the inter-FA measurement gap information indicates the information relating to the measurement gap allocated to the corresponding terminal.

In step 1305, the terminal measures the RSRP of the FA2 used by the compact base station and the RSRP of the FA1 used by the neighbor macro base station by periodically performing the inter-FA measurement based on the received measurement configuration message. Alternatively, when the RSRP measurement value of the FA1 used by the compact base station is smaller than the reference value, the terminal can measure the RSRP of the FA2 used by the compact base station and the RSRP of the FA1 used by the neighbor macro base station through the inter-FA measurement based on the received measurement configuration message.

In step 1307, the terminal determines whether the RSRP measurement value of the FA1 used by the macro base station is greater than the RSRP measurement value of the FA1 used by the compact base station.

When determining that the RSRP measurement value of the FA1 used by the macro base station is greater than the RSRP measurement value of the FA1 used by the compact base station in step 1307, the terminal generates the measurement report message including the RSRP measurement value of the FA2 used by the compact base station and sends the generated message to the compact base station in step 1309, and then proceeds to step 1311. Herein, the measurement report message is transmitted over the measurement gap allocated through the measurement gap information.

In step 1311, the terminal determines whether the FA change message for informing the terminal that the FA used to communicate with the compact base station is changed from the FA1 to the FA2 is received.

When receiving the FA change message for informing the terminal that the FA used to communicate with the compact base station is changed from the FA1 to the FA2 in step 1311, the terminal communicates with the compact base station using the FA2 in step 1313.

In contrast, when not receiving the FA change message for informing the terminal that the FA used to communicate with the compact base station is changed from the FA1 to the FA2 in step 1311, the terminal returns to step 1305.

When determining that the RSRP measurement value of the FA1 used by the macro base station is not greater than the RSRP measurement value of the FA1 used by the compact base station in step 1307, the terminal returns to step 1305.

Next, the terminal finishes this process.

Figure 14:
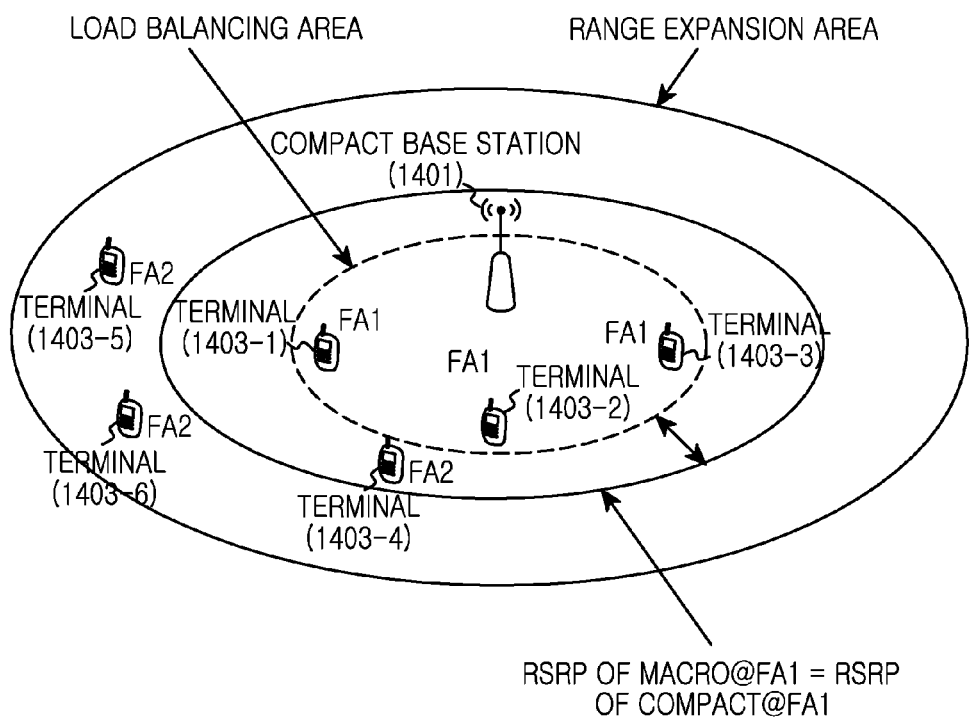
FIG. 14 is a diagram of load balancing in a compact cell of a heterogeneous network system according to an exemplary embodiment of the present invention.

FIG. 14 is a diagram of load balancing in a compact cell of a heterogeneous network system according to an exemplary embodiment of the present invention.

Referring to FIG. 14, the coverage area of a compact base station 1401 includes a coverage area for the communication between the compact base station 1401 and terminals 1403-1 through 1403-4 using the FA1, and a coverage area for the communication between the compact base station 1401 and terminals 1403-5 and 1403-6 using the FA2. The coverage area for the communication between the compact base station 1401 and terminals 1403-5 and 1403-6 using the FA2 applies the coverage area expansion of the compact cell.

The compact base station 1401 determines a total sum of resources used by the terminals 1403-1 through 1403-4 communicating with the compact base station 1401 using the FA1 in the compact cell. When the determined sum is greater than a maximum capacity of the FA1, the compact base station 1401 determines overload in the coverage area for communicating with the terminals 1403-1 through 1403-4 using the FA1.

The compact base station 1401 determines a total sum of resources used by the terminals 1403-5 and 1403-6 communicating with the compact base station 1401 using the FA2 in the expanded compact cell. When the determined sum is less than a maximum capacity of the FA2, the compact base station 1401 determines that the overload in the FA1 coverage area can be addressed by redistributing the resources using the FA2 coverage area.

Hence, with respect to terminal 1403-4 having the smallest FA1 RSRP among the terminals 1403-1 through 1403-4 communicating with the compact base station 1401 using the FA1 in the compact cell, the compact base station 1401 changes the FA of the corresponding terminal 1403-4 from the FA1 to the FA2. As a result, the load balancing in the compact cell is achieved.

Figure 15:
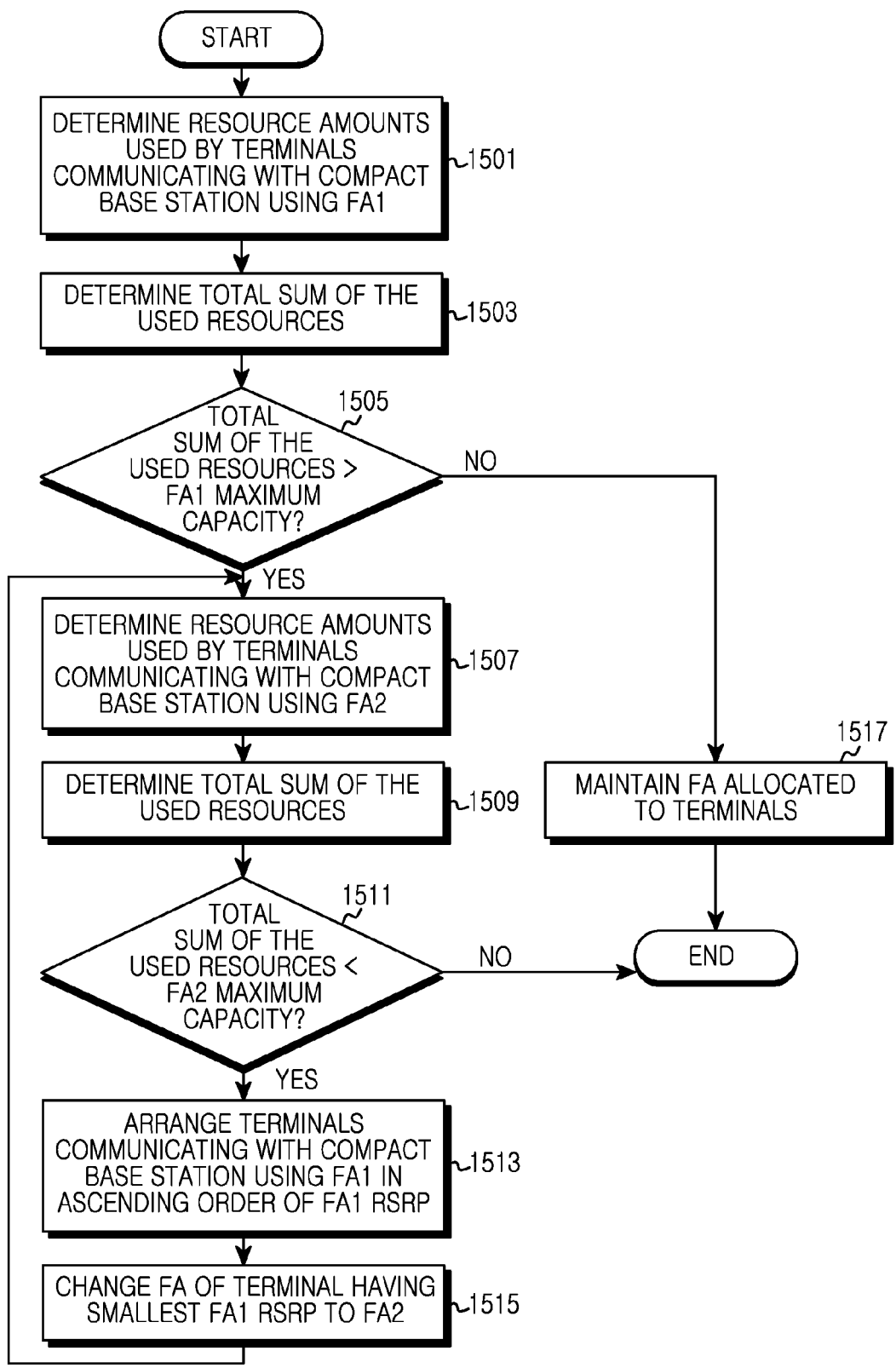
FIG. 15 is a flowchart of operations of a compact base station for supporting a load balancing in a compact cell of a heterogeneous network system according to an exemplary embodiment of the present invention.

FIG. 15 is a flowchart of operations of a compact base station for supporting a load balancing in a compact cell of a heterogeneous network system according to an exemplary embodiment of the present invention.

Referring to FIG. 15, the compact base station determines the resource amount used by each of the terminals communicating with the compact base station using the FA1 in the compact cell in step 1501.

Herein, it is provided that the resource amount used by each terminal is determined by considering only the traffic corresponding to a Guaranteed Bit Rate (GBR) service. The GBR service in the LTE system indicates a service that ensures a minimum throughput. A service rate for the GBR type service in a scheduler is based on data quantity scheduled from a Radio Link Control (RLC) layer to a PHYsical (PHY) layer. That is, when a packet of D(t) is scheduled at the time t, the service rate S(t) is given by Equation 2.

$$S(t) = \left(1 - \frac{1}{PDB}\right) \times S(t-1) + \frac{D(t)}{PDB} \qquad \text{Equation 2}$$

In Equation 2, a Pack Delay Budget (PDB), which is a threshold of delay of the packet per service, denotes a delay value allowed within 2%. D(t) denotes the data amount scheduled in the PHY layer at the time t. That is, $$\left(1 - \frac{1}{PDB}\right) \times S(t-1)$$

denotes the resource amount not processed at the previous time (t−1), and $$\frac{D(t)}{PDB}$$

denotes the resource amount requested to process at the current time t. Herein, the service of the GBR type should be scheduled such that the service rate S(t) does not exceed a predefined Maximum Bit Rate (MBR) during a certain time. In the LTE system, when the service rate is greater than the predefined MBR over a certain time, the scheduler can activate an MBR flag not to schedule until the service rate falls below the MBR. When the terminal retains m-ary radio bearers and n-ary bearers are for the GBR service, the resource amount used by the terminal can be defined as $$\sum_{i=1}^{n} S_i(t).$$

In step 1503, the compact base station determines the total sum of the resources used by the terminals communicating with the compact base station using the FA1 in the determined compact cell.

In step 1505, the compact base station determines whether the total sum of the resources used by the terminals communicating with the compact base station using the FA1 in the determined compact cell is greater than the maximum capacity of the FA1.

When determining that the total sum of the resources used by the terminals communicating with the compact base station using the FA1 in the determined compact cell is greater than the maximum capacity of the FA1 in step 1505, the compact base station determines the overload in the communication area of the terminal using the FA1 and determines the resource account used by each of the terminals communicating with the compact base station using the FA2 within the expanded compact cell in step 1507.

In step 1509, the compact base station determines the total sum of the resource amounts used by the terminals communicating with the compact base station using the FA2 within the determined expanded compact cell.

In step 1511, the compact base station determines whether the total sum of the resource amounts used by the terminals communicating with the compact base station using the FA2 within the determined expanded compact cell is less than the maximum capacity of the FA2.

When the total sum of the resource amounts used by the terminals communicating with the compact base station using the FA2 within the determined expanded compact cell is less than the maximum capacity of the FA2 in step 1511, the compact base station determines that the overload of the FA1 coverage area can be addressed by redistributing the resources using the FA2 coverage area and arranges the terminals communicating with the compact base station using the FA1 in the compact cell in the ascending order of the RSRP of the FA1 in step 1513, and then proceeds to step 1515.

With respect to the terminal having the smallest FA1 RSRP among the terminals communicating with the compact base station using the FA1 in the compact cell, the compact base station changes the FA of the corresponding terminal from the FA1 to the FA2 in step 1515. Next, the compact base station returns to step 1507.

In contrast, when the total sum of the resource amounts used by the terminals communicating with the compact base station using the FA2 within the determined expanded compact cell is not less than the maximum capacity of the FA2 in step 1511, the compact base station determines that the overload of the FA1 coverage area cannot be addressed by redistributing the resources using the FA2 coverage area and finishes this process.

When the total sum of the resources used by the terminals communicating with the compact base station using the FA1 in the determined compact cell is not greater than the maximum capacity of the FA1 in step 1505, the compact base station determines no overload in the coverage area for communicating with the terminal using the FA1, and retains the FA allocated to the terminals communicating with the compact base station using the FA1 in the compact cell in step 1517.

Next, the compact base station finishes this process.

Figure 16:
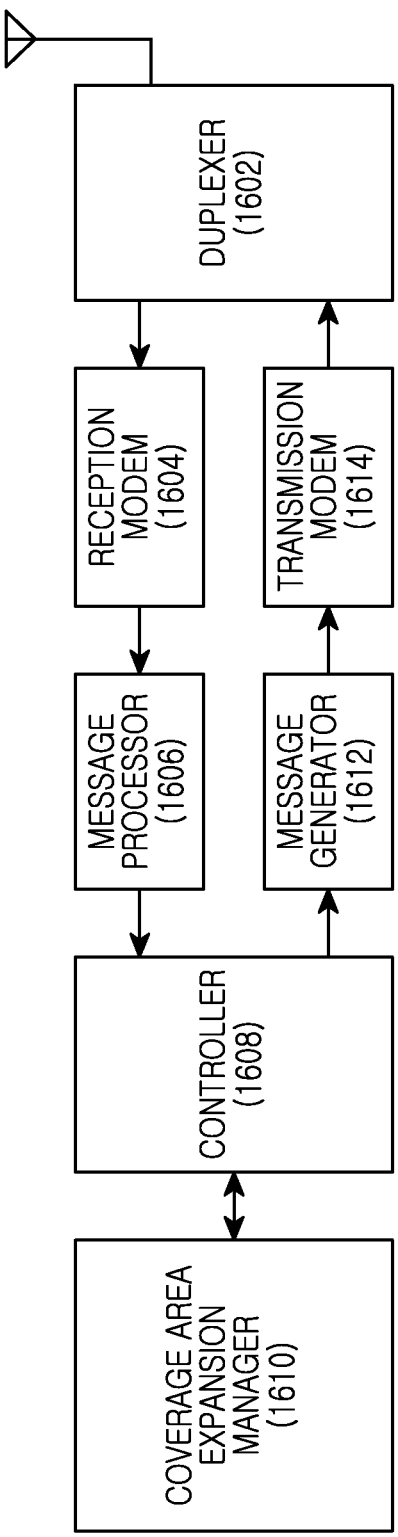
FIG. 16 is a block diagram of a base station (or a terminal) in a heterogeneous network system according to an exemplary embodiment of the present invention.

FIG. 16 is a block diagram of a base station (or a terminal) in a heterogeneous network system according to an exemplary embodiment of the present invention. Herein, the base station and the terminal have the same block structure, and thus the operations of the base station and the terminal are now explained with one exemplary apparatus. Herein, the base station represents the macro base station or the compact base station, and the terminal represents the terminal communicating with the macro base station or the compact base station.

As shown in FIG. 16, the base station (or the terminal) includes a duplexer 1602, a reception modem 1604, a message processor 1606, a controller 1608, a coverage area expansion manager 1610, a message generator 1612, and a transmission modem 1614.

Referring to FIG. 16, the duplexer 1602 transmits a transmit signal fed from the transmission modem 1614 via an antenna and provides a receive signal from the antenna to the reception modem 1604 according to the duplexing scheme.

The reception modem 1604 restores data from the signal output from the duplexer 1602 and sends the restored data to the message processor 1606. For example, the reception modem 1604 includes a Radio Frequency (RF) receiving block, a demodulating block, and a channel decoding block. The RF receiving block includes a filter and an RF preprocessor. When the wireless communication system conforms to Orthogonal Frequency Division Multiplexing (OFDM), the demodulating block includes a Fast Fourier Transform (FFT) operator for extracting data from subcarriers. The channel decoding block includes a demodulator, a deinterleaver, and a channel decoder.

The message processor 1606 decomposes the message received via the reception modem 1604 and provides the result to the controller 1608.

The controller 1608 controls operations of the base station (or the terminal). The controller 1608 provides the information received from the message processor 1606 to the coverage area expansion manager 1610, and provides information fed from the coverage area expansion manager 1610 to the message generator 1612.

The coverage area expansion manager 1610 supports the coverage area expansion of the compact cell. Specifically, when expanding the coverage area of the compact cell, the coverage area expansion manager 1610 supports the handover between the macrocell and the compact cell to minimize the interference received from the macro base station to the terminal communicating with the compact base station within the expanded compact cell coverage area. In the coverage area expansion of the compact cell, when the overload occurs in the compact cell, the coverage area expansion manager 1610 supports the load balancing in the compact cell.

The message generator 1612 generates and provides a message to transmit to the transmission modem 1614 under control of the controller 1608.

The transmission modem 1614 converts the message or the transmit data output from the message generator 1612 into a form for the transmission over the radio resource, and provides the converted message or data to the duplexer 1602. For example, the transmission modem 1614 includes a channel encoding block, a modulating block, and an RF transmitting block. The channel encoding block includes a modulator, an interleaver, and a channel encoder. When the wireless communication system adopts the OFDM scheme, the modulating block includes an Inverse FFT (IFFT) operator for mapping the data to the subcarriers. The RF transmitting block includes a filter and an RF preprocessor.

As set forth above, the terminal communicating with the compact base station in the expanded coverage area of the compact cell can smoothly communicate with the compact base station. As the macro offload is realized, the capacity can be enhanced according to the installation of the compact base station. Further, when the coverage area of the compact cell is expanded in the heterogeneous network system, the load balancing in the compact cell is supported. Thus, when the overload occurs in the compact cell, the overload can be addressed by adequately redistributing the resources.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operating method of a compact base station for supporting coverage area expansion of a compact cell in a heterogeneous network system, the method comprising:
   determining whether an overload takes place in a coverage area where a compact base station and a plurality of terminals communicate using a first Frequency Assignment (FA) in a compact cell;
   when the overload takes place in the coverage area where the compact base station and the plurality of terminals communicate using the first FA in the compact cell, determining whether resources are redistributable using a second FA in a coverage area expanded according to coverage area expansion of the compact cell; and
   when the resources are redistributable using the second FA in the coverage area expanded according to the coverage area expansion of the compact cell, changing the FA of at least one of the plurality of terminals communicating with the compact base station using the first FA in the compact cell, from the first FA to the second FA,
   wherein the first FA is a common FA of the compact cell and a macrocell, the second FA is a dedicated FA of the compact cell, and the second FA is used in the coverage area expanded according to the coverage area expansion of the compact cell.

2. The operating method of claim 1, wherein the determining of whether the overload takes place comprises:
   determining a total sum of resource amounts used by the plurality of terminals communicating with the compact base station using the first FA in the compact cell; and
   determining whether the determined total sum of the resource amounts used by the terminals communicating with the compact base station using the first FA in the compact cell is greater than a maximum capacity of the first FA.

3. The operating method of claim 2, further comprising:
   determining the resource amounts used by the plurality of terminals communicating with the compact base station using the first FA in the compact cell,
   wherein the resource amount used by each of the plurality of terminals is determined based on the following equation by considering traffic corresponding to a Guaranteed Bit Rate (GBR) service:

$$S(t) = \left(1 - \frac{1}{PDB}\right) \times S(t-1) + \frac{D(t)}{PDB}$$

where S(t) denotes a service rate for the GBR type service, a Pack Delay Budget PDB, which is a threshold of delay of a packet per service, denotes a delay value allowed within 2%, and D(t) denotes a data amount scheduled at a time t.

4. The operating method of claim 1, wherein the determining of whether the resources are redistributable comprises:
   determining a total sum of resource amounts used by the plurality of terminals communicating with the compact base station using the second FA in a coverage area expanded according to the coverage area expansion of the compact cell; and determining whether the determined total sum of the resource amounts used by the terminals communicating with the compact base station using the second FA in the expanded coverage area is less than a maximum capacity of the second FA.

5. The operating method of claim 1, wherein the at least one of the plurality of terminals has the smallest Reference Signal Received Power (RSRP) for the first FA among the terminals communicating with the compact base station using the first FA in the compact cell.

6. An operating method of a macro base station for supporting coverage area expansion of a compact cell in a heterogeneous network system, the method comprising:
receiving a measurement report message comprising a Reference Signal Received Power (RSRP) measurement value of a second Frequency Assignment (FA) used by a neighbor compact base station, from a terminal communicating with the macro base station using a first FA;
based on the RSRP measurement value of the second FA used by the neighbor compact base station, determining whether to approve inter-FA handover of the terminal to an expanded compact cell using the second FA; and
when determining to approve the inter-FA handover to the expanded compact cell using the second FA, generating a handover command message for instructing the terminal to inter-FA handover to the expanded compact cell using the second FA and sending the handover command message to the terminal,
wherein the first FA is a common FA of the compact cell and a macrocell, the second FA is a dedicated FA of the compact cell, and the second FA is used in a coverage area expanded according to coverage area expansion of the compact cell.

7. An operating method of a terminal which communicates with a macro base station, for supporting coverage area expansion of a compact cell in a heterogeneous network system, the method comprising:
when communicating with a macro base station using a first Frequency Assignment (FA), measuring Reference Signal Received Power (RSRP) of a second FA used by a neighbor compact base station by performing inter-FA measurement;
determining whether the RSRP measurement value of the second FA used by the neighbor compact base station satisfies a measurement report triggering condition;
when the RSRP measurement value of the second FA used by the neighbor compact base station satisfies the measurement report triggering condition, generating a measurement report message comprising the RSRP measurement value of the second FA used by the neighbor compact base station and sending the measurement report message to the macro base station; and
when receiving a handover command message for instructing the terminal to inter-FA handover to the expanded compact cell using the second FA, from the macro base station, performing the inter-FA handover to the expanded compact cell using the second FA,
wherein the first FA is a common FA of the compact cell and a macrocell, the second FA is a dedicated FA of the compact cell, and the second FA is used in a coverage area expanded according to coverage area expansion of the compact cell.

8. The operating method of claim 7, wherein the measurement report triggering condition is given by the following equation:

$$Mn+Ofn+Ocn-Hys>Ms+Ofs+Ocs+Off$$

where Mn denotes an RSRP measurement value of a neighbor cell, Ms denotes an RSRP measurement value of a serving cell, Ofn denotes an offset value based on a carrier frequency of the neighbor cell, Ofs denotes an offset value based on a carrier frequency of the serving cell, Ocn denotes an offset value used to control a signal level of the neighbor cell in handover, Ocs denotes an offset value used to control a signal level of the serving cell in the handover, Hys denotes an offset value to reflect common characteristics of events comprising an A3 event, and Off denotes an offset value to reflect characteristics of the A3 event, wherein, for the inter-FA handover from the macrocell using the first FA to the expanded compact cell using the second FA, other offset values except for Ofn in the equation are set to a value of 0 dB, and Ofn is set to a positive value.

9. An operating method of a compact base station for supporting coverage area expansion of a compact cell in a heterogeneous network system, the method comprising:
receiving a measurement report message comprising a Reference Signal Received Power (RSRP) measurement value of a first Frequency Assignment (FA) used by a neighbor macro base station, from a terminal communicating with a compact base station using a second FA;
based on the RSRP measurement value of the first FA used by the neighbor macro base station, determining whether to approve inter-FA handover to a macrocell using the first FA; and
when determining to approve the inter-FA handover to the macrocell using the first FA, generating a handover command message for instructing the terminal to inter-FA handover to the macrocell using the first FA and sending the handover command message to the terminal,
wherein the first FA is a common FA of the compact cell and the macrocell, the second FA is a dedicated FA of the compact cell, and the second FA is used in a coverage area expanded according to coverage area expansion of the compact cell.

10. An operating method of a terminal which communicates with a compact base station, for supporting coverage area expansion of a compact cell in a heterogeneous network system, the method comprising:
when communicating with a compact base station using a second Frequency Assignment (FA), measuring Reference Signal Received Power (RSRP) of a first FA used by a neighbor macro base station by performing inter-FA measurement;
determining whether the RSRP measurement value of the first FA used by the neighbor macro base station satisfies a measurement report triggering condition;
when the RSRP measurement value of the first FA used by the neighbor macro base station satisfies the measurement report triggering condition, generating a measurement report message comprising the RSRP measurement value of the first FA used by the neighbor macro base station and sending the measurement report message to the compact base station; and
when receiving a handover command message for instructing the terminal to inter-FA handover to the macrocell using the first FA, from the compact base station, performing the inter-FA handover to the macrocell using the first FA,
wherein the first FA is a common FA of the compact cell and the macrocell, the second FA is a dedicated FA of the compact cell, and the second FA is used in a coverage area expanded according to coverage area expansion of the compact cell.

11. The operating method of claim 10, wherein the measurement report triggering condition is given by the following equation:

$$Mn+Ofn+Ocn-Hys>Ms+Ofs+Ocs+Off$$

where Mn denotes an RSRP measurement value of a neighbor cell, Ms denotes an RSRP measurement value of a serving cell, Ofn denotes an offset value based on a carrier frequency of the neighbor cell, Ofs denotes an offset value based on a carrier frequency of the serving cell, Ocn denotes an offset value used to control a signal level of the neighbor cell in handover, Ocs denotes an offset value used to control a signal level of the serving cell in the handover, Hys denotes an offset value to reflect common characteristics of events comprising an A3 event, and Off denotes an offset value to reflect characteristics of the A3 event, wherein, for the inter-FA handover from the macrocell using the first FA to the expanded compact cell using the second FA, other offset values except for Ofn in the equation are set to a value of 0 dB, and Ofn is set to a positive value.

12. An operating method of a compact base station for supporting coverage area expansion of a compact cell in a heterogeneous network system, the method comprising:
- receiving a measurement report message comprising a Reference Signal Received Power (RSRP) measurement value of a first Frequency Assignment (FA) used by the compact base station, from a terminal communicating with the compact base station using a second FA;
- based on the RSRP measurement value of the first FA used by the compact base station, determining whether to approve FA change from the second FA to the first FA; and
- when determining to approve the FA change from the second FA to the first FA, changing the FA used to communicate with the terminal from the second FA to the first FA,
- wherein the first FA is a common FA of the compact cell and a macrocell, the second FA is a dedicated FA of the compact cell, and the second FA is used in a coverage area expanded according to coverage area expansion of the compact cell.

13. An operating method of a terminal which communicates with a compact base station, for supporting coverage area expansion of a compact cell in a heterogeneous network system, the method comprising:
- when communicating with the compact base station using a second Frequency Assignment (FA), measuring Reference Signal Received Power (RSRP) of a first FA used by the compact base station and RSRP of the first FA used by a neighbor macro base station by performing inter-FA measurement;
- determining whether the RSRP of the first FA used by the compact base station is greater than the RSRP of the first FA used by the macro base station; and
- when the RSRP of the first FA used by the compact base station is greater than the RSRP of the first FA used by the macro base station, generating a measurement report message comprising the RSRP measurement value of the first FA used by the compact base station and sending the measurement report message to the compact base station,
- wherein the first FA is a common FA of the compact cell and a macrocell, the second FA is a dedicated FA of the compact cell, and the second FA is used in a coverage area expanded according to coverage area expansion of the compact cell.

14. An operating method of a compact base station for supporting coverage area expansion of a compact cell in a heterogeneous network system, the method comprising:
- receiving a measurement report message comprising a Reference Signal Received Power (RSRP) measurement value of a second Frequency Assignment (FA) used by the compact base station, from a terminal communicating with the compact base station using a first FA;
- based on the RSRP measurement value of the second FA used by the compact base station, determining whether to approve FA change from the first FA to the second FA; and
- when determining to approve the FA change from the first FA to the second FA, changing the FA used to communicate with the terminal from the first FA to the second FA,
- wherein the first FA is a common FA of the compact cell and a macrocell, the second FA is a dedicated FA of the compact cell, and the second FA is used in a coverage area expanded according to coverage area expansion of the compact cell.

15. An operating method of a terminal which communicates with a compact base station, for supporting coverage area expansion of a compact cell in a heterogeneous network system, the method comprising:
- when communicating with the compact base station using a first Frequency Assignment (FA), measuring Reference Signal Received Power (RSRP) of a second FA used by the compact base station and RSRP of the first FA used by a neighbor macro base station by performing inter-FA measurement;
- determining whether the RSRP of the first FA used by the macro base station is greater than the RSRP of the first FA used by the compact base station; and
- when the RSRP of the first FA used by the macro base station is greater than the RSRP of the first FA used by the compact base station, generating a measurement report message comprising the RSRP measurement value of the second FA used by the compact base station and sending the measurement report message to the compact base station,
- wherein the first FA is a common FA of the compact cell and a macrocell, the second FA is a dedicated FA of the compact cell, and the second FA is used in a coverage area expanded according to coverage area expansion of the compact cell.

16. An apparatus of a compact base station for supporting coverage area expansion of a compact cell in a heterogeneous network system, the apparatus comprising:
- a coverage area expansion manager for determining whether an overload takes place in a coverage area where a compact base station and a plurality of terminals communicate using a first Frequency Assignment (FA) in a compact cell, for, when the overload takes place in the coverage area where the compact base station and the plurality of terminals communicate using the first FA in the compact cell, determining whether resources are redistributable using a second FA in a coverage area expanded according to coverage area expansion of the compact cell, and for, when the resources are redistributable using the second FA in the coverage area expanded according to the coverage area expansion of the compact cell, changing the FA of at least one of the plurality of terminals communicating with the compact base station using the first FA in the compact cell, from the first FA to the second FA, wherein the first FA is a common FA of the compact cell and a macrocell, the second FA is a dedicated FA of the compact cell, and the second FA is used in the coverage area expanded according to the coverage area expansion of the compact cell.

17. The apparatus of claim 16, wherein the coverage area expansion manager determines a total sum of resource amounts used by the plurality of terminals communicating with the compact base station using the first FA in the compact cell, and determines whether the overload takes place by determining whether the determined total sum of the resource amounts used by the terminals communicating with the compact base station using the first FA in the compact cell is greater than a maximum capacity of the first FA.

18. The apparatus of claim 17, wherein the coverage area expansion manager determines the resource amounts used by the plurality of terminals communicating with the compact base station using the first FA in the compact cell, and
wherein the resource amount used by each of the plurality of terminals is determined based on the following equation by considering traffic corresponding to a Guaranteed Bit Rate (GBR) service:

$$S(t) = \left(1 - \frac{1}{PDB}\right) \times S(t-1) + \frac{D(t)}{PDB}$$

where S(t) denotes a service rate for the GBR type service, a Pack Delay Budget PDB, which is a threshold of delay of a packet per service, denotes a delay value allowed within 2%, and D(t) denotes a data amount scheduled at a time t.

19. The apparatus of claim 16, wherein the coverage area expansion manager determines a total sum of resource amounts used by the plurality of terminals communicating with the compact base station using the second FA in a coverage area expanded according to the coverage area expansion of the compact cell, and determines whether the resources are redistributable by determining whether the determined total sum of the resource amounts used by the terminals communicating with the compact base station using the second FA in the expanded coverage area is smaller than a maximum capacity of the second FA.

20. The apparatus of claim 16, wherein the at least one of the plurality of terminals has the smallest Reference Signal Received Power (RSRP) for the first FA among the terminals communicating with the compact base station using the first FA in the compact cell.

21. An apparatus of a macro base station for supporting coverage area expansion of a compact cell in a heterogeneous network system, the apparatus comprising:
a reception modem for receiving a measurement report message comprising a Reference Signal Received Power (RSRP) measurement value of a second Frequency Assignment (FA) used by a neighbor compact base station, from a terminal communicating with a macro base station using a first FA;
a coverage area expansion manager for, based on the RSRP measurement value of the second FA used by the neighbor compact base station, determining whether to approve inter-FA handover to an expanded compact cell using the second FA;
a message generator for, when determining to approve the inter-FA handover to the expanded compact cell using the second FA, generating a handover command message for instructing the terminal to inter-FA handover to the expanded compact cell using the second FA; and
a transmission modem for sending the generated handover command message to the terminal,
wherein the first FA is a common FA of the compact cell and a macrocell, the second FA is a dedicated FA of the compact cell, and the second FA is used in a coverage area expanded according to coverage area expansion of the compact cell.

22. An apparatus of a terminal which communicates with a macro base station, for supporting coverage area expansion of a compact cell in a heterogeneous network system, the apparatus comprising:
a coverage area expansion manager for, when communicating with a macro base station using a first Frequency Assignment (FA), measuring Reference Signal Received Power (RSRP) of a second FA used by a neighbor compact base station by performing inter-FA measurement, and for determining whether the RSRP measurement value of the second FA used by the neighbor compact base station satisfies a measurement report triggering condition;
a message generator for, when the RSRP measurement value of the second FA used by the neighbor compact base station satisfies the measurement report triggering condition, generating a measurement report message comprising the RSRP measurement value of the second FA used by the neighbor compact base station; and
a transmission modem for sending the generated measurement report message to the macro base station,
wherein, when receiving a handover command message for instructing the terminal to inter-FA handover to the expanded compact cell using the second FA, from the macro base station, the coverage area expansion manager performs the inter-FA handover to the expanded compact cell using the second FA, and
wherein the first FA is a common FA of the compact cell and a macrocell, the second FA is a dedicated FA of the compact cell, and the second FA is used in a coverage area expanded according to coverage area expansion of the compact cell.

23. The apparatus of claim 22, wherein the measurement report triggering condition is given by the following equation:

$$Mn+Ofn+Ocn-Hys>Ms+Ofs+Ocs+Off$$

where Mn denotes an RSRP measurement value of a neighbor cell, Ms denotes an RSRP measurement value of a serving cell, Ofn denotes an offset value based on a carrier frequency of the neighbor cell, Ofs denotes an offset value based on a carrier frequency of the serving cell, Ocn denotes an offset value used to control a signal level of the neighbor cell in handover, Ocs denotes an offset value used to control a signal level of the serving cell in the handover, Hys denotes an offset value to reflect common characteristics of events comprising an A3 event, and Off denotes an offset value to reflect characteristics of the A3 event, wherein, for the inter-FA handover from the macrocell using the first FA to the expanded compact cell using the second FA, other offset values except for Ofn in the equation are set to a value of 0 dB, and Ofn is set to a positive value.

24. An apparatus of a compact base station for supporting coverage area expansion of a compact cell in a heterogeneous network system, the apparatus comprising:
a reception modem for receiving a measurement report message comprising a Reference Signal Received Power (RSRP) measurement value of a first Frequency Assignment (FA) used by a neighbor macro base station, from a terminal communicating with a compact base station using a second FA;

a coverage area expansion manager for, based on the RSRP measurement value of the first FA used by the neighbor macro base station, determining whether to approve inter-FA handover to a macrocell using the first FA;

a message generator for, when determining to approve the inter-FA handover to the macrocell using the first FA, generating a handover command message for instructing the terminal to inter-FA handover to the macrocell using the first FA; and a transmission modem for sending the generated handover command message to the terminal, wherein the first FA is a common FA of the compact cell and a macrocell, the second FA is a dedicated FA of the compact cell, and the second FA is used in a coverage area expanded according to coverage area expansion of the compact cell.

25. An apparatus of a terminal which communicates with a compact base station, for supporting coverage area expansion of a compact cell in a heterogeneous network system, the apparatus comprising:

a coverage area expansion manager for, when communicating with a compact base station using a second Frequency Assignment (FA), measuring Reference Signal Received Power (RSRP) of a first FA used by a neighbor macro base station by performing inter-FA measurement, and for determining whether the RSRP measurement value of the first FA used by the neighbor macro base station satisfies a measurement report triggering condition;

a message generator for, when the RSRP measurement value of the first FA used by the neighbor macro base station satisfies the measurement report triggering condition, generating a measurement report message comprising the RSRP measurement value of the first FA used by the neighbor macro base station; and a transmission modem for sending the generated measurement report message to the compact base station, wherein, when receiving a handover command message for instructing the terminal to inter-FA handover to the macrocell using the first FA, from the compact base station, the coverage area expansion manager performs the inter-FA handover to the macrocell using the first FA, and wherein the first FA is a common FA of the compact cell and the macrocell, the second FA is a dedicated FA of the compact cell, and the second FA is used in a coverage area expanded according to coverage area expansion of the compact cell.

26. The apparatus of claim 25, wherein the measurement report triggering condition is given by the following equation:

$$Mn+Ofn+Ocn-Hys>Ms+Ofs+Ocs+Off$$

where Mn denotes an RSRP measurement value of a neighbor cell, Ms denotes an RSRP measurement value of a serving cell, Ofn denotes an offset value based on a carrier frequency of the neighbor cell, Ofs denotes an offset value based on a carrier frequency of the serving cell, Ocn denotes an offset value used to control a signal level of the neighbor cell in handover, Ocs denotes an offset value used to control a signal level of the serving cell in the handover, Hys denotes an offset value to reflect common characteristics of events comprising an A3 event, and Off denotes an offset value to reflect characteristics of the A3 event, wherein, for the inter-FA handover from the macrocell using the first FA to the expanded compact cell using the second FA, other offset values except for Ofn in the equation are set to a value of 0 dB, and Ofn is set to a positive value.

27. An apparatus of a compact base station for supporting coverage area expansion of a compact cell in a heterogeneous network system, the apparatus comprising:

a reception modem for receiving a measurement report message comprising a Reference Signal Received Power (RSRP) measurement value of a first Frequency Assignment (FA) used by the compact base station, from a terminal communicating with the compact base station using a second FA; and a coverage area expansion manager for, based on the RSRP measurement value of the first FA used by the compact base station, determining whether to approve FA change from the second FA to the first FA, and for changing the FA used to communicate with the terminal from the second FA to the first FA when determining to approve the FA change from the second FA to the first FA, wherein the first FA is a common FA of the compact cell and a macrocell, the second FA is a dedicated FA of the compact cell, and the second FA is used in a coverage area expanded according to coverage area expansion of the compact cell.

28. An apparatus of a terminal which communicates with a compact base station, for supporting coverage area expansion of a compact cell in a heterogeneous network system, the apparatus comprising:

a coverage area expansion manager for, when communicating with the compact base station using a second Frequency Assignment (FA), measuring Reference Signal Received Power (RSRP) of a first FA used by the compact base station and RSRP of the first FA used by a neighbor macro base station by performing inter-FA measurement, and for determining whether the RSRP measurement value of the first FA used by the compact base station is greater than the RSRP measurement value of the first FA used by the macro base station;

a message generator for, when the RSRP measurement value of the first FA used by the compact base station is greater than the RSRP measurement value of the first FA used by the macro base station, generating a measurement report message comprising the RSRP measurement value of the first FA used by the compact base station; and a transmission modem for sending the generated measurement report message to the compact base station, wherein the first FA is a common FA of the compact cell and a macrocell, the second FA is a dedicated FA of the compact cell, and the second FA is used in a coverage area expanded according to coverage area expansion of the compact cell.

29. An apparatus of a compact base station for supporting coverage area expansion of a compact cell in a heterogeneous network system, the apparatus comprising:

a reception modem for receiving a measurement report message comprising a Reference Signal Received Power (RSRP) measurement value of a second Frequency Assignment (FA) used by the compact base station, from a terminal communicating with the compact base station using a first FA; and a coverage area expansion manager for, based on the RSRP measurement value of the second FA used by the compact base station, determining whether to approve FA change from the first FA to the second FA, and for changing the FA used to communicate with the terminal from the first FA to the second FA when determining to approve the FA change from the first FA to the second FA, wherein the first FA is a common FA of the compact cell and a macrocell, the second FA is a dedicated FA of the compact cell, and the second FA is used in a coverage area expanded according to coverage area expansion of the compact cell.

30. An apparatus of a terminal which communicates with a compact base station, for supporting coverage area expansion of a compact cell in a heterogeneous network system, the apparatus comprising:

a coverage area expansion manager for, when communicating with the compact base station using a first Frequency Assignment (FA), measuring Reference Signal Received Power (RSRP) of a second FA used by the compact base station and RSRP of the first FA used by a neighbor macro base station by performing inter-FA measurement, and for determining whether the RSRP measurement value of the first FA used by the macro base station is greater than the RSRP measurement value of the first FA used by the compact base station;

a message generator for, when the RSRP of the first FA used by the macro base station is greater than the RSRP measurement value of the first FA used by the compact base station, generating a measurement report message comprising the RSRP measurement value of the second FA used by the compact base station; and a transmission modem for sending the generated measurement report message to the compact base station, wherein the first FA is a common FA of the compact cell and a macrocell, the second FA is a dedicated FA of the compact cell, and the second FA is used in a coverage area expanded according to coverage area expansion of the compact cell.

* * * * *